United States Patent
Yao et al.

(10) Patent No.: US 11,158,017 B2
(45) Date of Patent: Oct. 26, 2021

(54) WAREHOUSE MANAGEMENT SYSTEM

(71) Applicant: SAP SE, Walldorf (DE)

(72) Inventors: Leiyi Yao, Shanghai (CN); Xin Chen, Shanghai (CN); Likun Hou, Shanghai (CN)

(73) Assignee: SAP SE, Walldorf (DE)

( * ) Notice: Subject to any disclaimer, the term of this patent is extended or adjusted under 35 U.S.C. 154(b) by 1178 days.

(21) Appl. No.: 15/393,065

(22) Filed: Dec. 28, 2016

(65) Prior Publication Data

US 2018/0182054 A1 Jun. 28, 2018

(51) Int. Cl.
*G06Q 50/28* (2012.01)
*G06Q 10/06* (2012.01)
*G06Q 30/06* (2012.01)
*G01C 21/20* (2006.01)

(52) U.S. Cl.
CPC .......... *G06Q 50/28* (2013.01); *G01C 21/206* (2013.01); *G06Q 10/063112* (2013.01); *G06Q 30/0635* (2013.01)

(58) Field of Classification Search
None
See application file for complete search history.

(56) References Cited

U.S. PATENT DOCUMENTS

| | | | | |
|---|---|---|---|---|
| 6,904,421 B2 * | 6/2005 | Shetty | ................. | G06Q 10/047 706/13 |
| 7,295,990 B1 * | 11/2007 | Braumoeller | ........ | G06Q 10/063 705/7.31 |
| 7,747,543 B1 * | 6/2010 | Braumoeller | ...... | G06Q 10/0833 705/330 |
| 8,352,382 B1 * | 1/2013 | Katta | ................... | G06Q 10/087 705/330 |
| 8,620,707 B1 * | 12/2013 | Belyi | .................. | G06Q 10/087 705/7.12 |

(Continued)

FOREIGN PATENT DOCUMENTS

| EP | 2953069 A1 * | 12/2015 | ....... G06Q 10/06314 |
|---|---|---|---|
| EP | 3133550 A1 * | 2/2017 | ............ G08B 7/066 |

(Continued)

OTHER PUBLICATIONS

Rubrico, Jose Ildefonso U., et al. "Metaheuristic scheduling of multiple picking agents for warehouse management." Industrial Robot : An International Journal (2008). (Year: 2008).*

(Continued)

*Primary Examiner* — Thomas L Mansfield
*Assistant Examiner* — Derick J Holzmacher
(74) *Attorney, Agent, or Firm* — Schwegman Lundberg & Woessner, P.A.

(57) ABSTRACT

Various examples are directed to systems and methods for managing a warehouse. For example, a set of candidate routes through the warehouse may be generated based at least in part on graph data describing a plurality of nodes comprising a depot node, and a plurality of internode paths. Orders may be assigned to routes from the set of candidate routes to minimize a total duration for the routes. A set of tasks may be generated, where a first task of the set of tasks comprises a route and an order of the plurality of orders matched to the route. Tasks from the set of tasks may be assigned to picking agents to minimize a duration of the longest task from the set of tasks.

20 Claims, 11 Drawing Sheets

(56) References Cited

U.S. PATENT DOCUMENTS

| | | | | |
|---|---|---|---|---|
| 8,655,705 | B2* | 2/2014 | Riepshoff | G06Q 10/06316 705/7.26 |
| 8,732,039 | B1* | 5/2014 | Chen | G06Q 10/087 705/28 |
| 8,924,341 | B2* | 12/2014 | Rothberg | G06N 3/126 706/62 |
| 9,172,738 | B1* | 10/2015 | daCosta | G06Q 10/087 |
| 9,183,058 | B2* | 11/2015 | Li | G06F 9/5066 |
| 9,350,643 | B2* | 5/2016 | Wang | H04L 45/125 |
| 9,530,093 | B2* | 12/2016 | Sandeep | G06N 3/126 |
| 2003/0084011 | A1* | 5/2003 | Shetty | G06Q 10/047 706/13 |
| 2005/0206943 | A1* | 9/2005 | Fukuda | G06Q 10/087 358/1.14 |
| 2005/0246192 | A1* | 11/2005 | Jauffred | G06Q 10/08355 705/338 |
| 2006/0241986 | A1* | 10/2006 | Harper | G06N 3/126 705/7.26 |
| 2007/0067200 | A1* | 3/2007 | Patel | G06Q 10/063114 705/7.14 |
| 2008/0077464 | A1* | 3/2008 | Gottlieb | G06Q 10/087 705/28 |
| 2009/0070281 | A1* | 3/2009 | Solomon | G06N 3/126 706/13 |
| 2009/0082902 | A1* | 3/2009 | Foltz | G06Q 10/087 700/214 |
| 2009/0228417 | A1* | 9/2009 | Rothberg | G06N 3/126 706/46 |
| 2010/0106539 | A1* | 4/2010 | Kenefic | G06Q 10/063 705/7.26 |
| 2010/0280748 | A1* | 11/2010 | Mundinger | G01C 21/3423 701/532 |
| 2010/0287073 | A1* | 11/2010 | Kocis | G06Q 10/08355 705/28 |
| 2011/0040750 | A1* | 2/2011 | Safra | G06Q 10/047 707/723 |
| 2011/0238457 | A1* | 9/2011 | Mason | G06Q 10/063112 705/7.14 |
| 2012/0310691 | A1* | 12/2012 | Carlsson | G08G 1/202 705/7.13 |
| 2013/0066610 | A1* | 3/2013 | Stevens | G06Q 10/08 703/6 |
| 2014/0039964 | A1* | 2/2014 | Sengupta | G06Q 10/08 705/7.25 |
| 2014/0046733 | A1* | 2/2014 | Grichnik | G06Q 10/06375 705/7.37 |
| 2014/0136255 | A1* | 5/2014 | Grabovski | G06Q 10/063112 705/7.14 |
| 2014/0180958 | A1* | 6/2014 | Arunapuram | G06Q 10/08355 705/338 |
| 2014/0279294 | A1* | 9/2014 | Field-Darragh | H04B 5/0062 705/28 |
| 2015/0356483 | A1* | 12/2015 | Saliba | G06F 16/2237 705/7.24 |
| 2015/0371135 | A1* | 12/2015 | Sandeep | G06N 5/02 706/13 |
| 2016/0171366 | A1* | 6/2016 | Sandeep | G06N 20/00 706/13 |
| 2016/0300174 | A1* | 10/2016 | Grichnik | G06Q 10/087 |
| 2017/0053503 | A1* | 2/2017 | Pal | G08B 7/066 |
| 2017/0185928 | A1* | 6/2017 | Zhou | G06Q 10/083 |
| 2018/0270121 | A1* | 9/2018 | Stringfellow | H04L 41/142 |

FOREIGN PATENT DOCUMENTS

| | | | | |
|---|---|---|---|---|
| WO | WQ-9526007 A1 * | 9/1995 | | G06Q 10/047 |
| WO | WO-2009065637 A1 * | 5/2009 | | G06Q 40/08 |

OTHER PUBLICATIONS

Rubrico, Jose lldefonso U., et al. "A Fast Scheduler for Multiagent in a Warehouse." IJAT 3.2 (2009): 165-173. (Year: 2009).*

De Santis, Roberta, et al. "An adapted ant colony optimization algorithm for the minimization of the travel distance of pickers in manual warehouses." European Journal of Operational Research 267.1 (2018): 120-137. (Year: 2018).*

Lu, Wenrong, et al. "An algorithm for dynamic order-picking in warehouse operations." European Journal of Operational Research 248.1 (2016): 107-122. (Year: 2016).*

Henn, Sebastian, et al. "Metaheuristics for the order batching problem in manual order picking systems." Business Research 3.1 (2010): 82-105. (Year: 2010).*

Chen, Fangyu, et al. "An ACO-based online routing method for multiple order pickers with congestion consideration in warehouse." Journal of Intelligent Manufacturing 27.2 (2016): 389-408. (Year: 2016).*

Rubrico, Jose IU, et al. "Online rescheduling of multiple picking agents for warehouse management." Robotics and Computer-Integrated Manufacturing 27.1 (2011): 62-71. (Year: 2011).*

Rubrico, Jose lldefonso U., et al. "Route generation for warehouse management using fast heuristics." 2004 IEEE/RSJ International Conference on Intelligent Robots and Systems (IROS)(IEEE Cat. No. 04CH37566). vol. 2. IEEE, 2004. (Year: 2004).*

Gademann, Noud, and Steef Velde. "Order batching to minimize total travel time in a parallel-aisle warehouse." IIE transactions 37.1 (2005): 63-75. (Year: 2005).*

Rubrico, Jose Ildefonso U., et al. "A Fast Scheduler for Multiagent in a Warehouse." IJAT 3.2 (2009): 165-173. (Year: 2009).*

Chan, F. T. S., and V. Kumar. "Hybrid TSSA algorithm-based approach to solve warehouse-scheduling problems." International Journal of Production Research 47.4 (2009): 919-940. (Year: 2009).*

Wang, Ko-Hsin Cindy, and Adi Botea. "MAPP: a scalable multi-agent path planning algorithm with tractability and completeness guarantees." Journal of Artificial Intelligence Research 42 (2011): 55-90. (Year: 2011).*

Henn, Sebastian, Sbren Koch, and Gerhard Wascher. "Order batching in order picking warehouses: a survey of solution approaches." Warehousing in the global supply chain. Springer, London, 2012. 105-137. (Year: 2012).*

Hong, Soondo, Andrew L. Johnson, and Brett A. Peters. "Large-scale order batching in parallel-aisle picking systems." IIE Transactions 44.2 (2012): 88-106. (Year: 2012).*

Cheng, Chen-Yang, et al. "Using a hybrid approach based on the particle swarm optimization and ant colony optimization to solve a joint order batching and picker routing problem." International Journal of Production Economics 170 (2015): 805-814. (Year: 2015).*

Azadeh, Kaveh, Rene De Koster, and Debjit Roy. "Robotized warehouse systems: Developments and research opportunities." ERIM report series research in management Erasmus Research Institute of Management ERS-2017-009-LIS (2017). (Year: 2017).*

Ardjmand, Ehsan, et al. "Minimizing order picking makespan with multiple pickers in a wave picking warehouse." International Journal of Production Economics 206 (2018): 169-183. (Year: 2018).*

* cited by examiner

WAREHOUSE MANAGEMENT SYSTEM

TECHNICAL FIELD

This document generally relates to methods and systems for use with computer networks. More particularly, this document relates to methods and systems for configuring and using a database management system.

BACKGROUND

Internet retailers and other companies that provide products to customers by mail typically store products in large warehouses. Individual customer orders are filled by retrieving or "picking" the ordered products from the warehouse and shipping them to the customer. Quickly and efficiently picking warehouse orders can present a considerable challenge.

BRIEF DESCRIPTION OF DRAWINGS

The present disclosure is illustrated by way of example and not limitation in the following figures.

DETAILED DESCRIPTION

Figure 1:
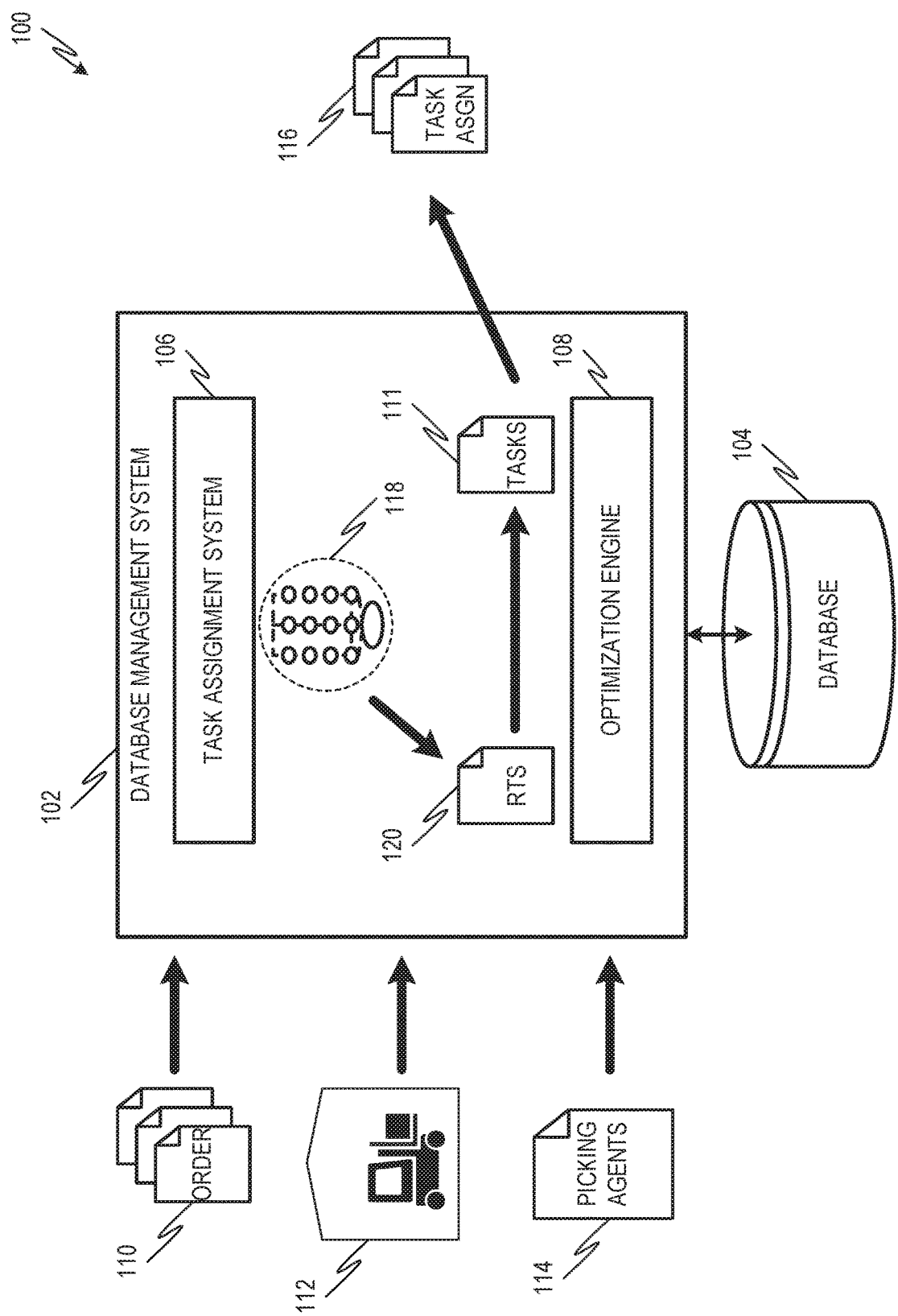
FIG. 1 is a diagram showing one example of an environment for warehouse management.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Various examples described herein are directed to systems and methods for managing the picking of customer orders ("orders") at a warehouse. For example, the database management system may generate a set of candidate routes through the warehouse. The database management system may assign orders to the various routes. From the routes and assigned orders, the database management system may generate tasks. A task may include a route and one or more orders assigned to the route. The database management system may also assign tasks to one or more picking agents. A picking agent may be a person or machine (e.g., robot) that travels a route and picks products indicated by orders on the route.

The database management system may receive or generate warehouse graph data describing a warehouse graph. The warehouse graph may include a plurality of nodes and a plurality of internode paths connecting the nodes. A node may correspond to a location in the warehouse. For example, some nodes may correspond to locations in the warehouse where one or more products are located and may be picked. The warehouse graph may also include one or more depot nodes. A depot node may correspond to a depot location in the warehouse where products can be deposited, for example, to be packed and shipped to the customer. A path may extend from one node to another node. The warehouse graph may be undirected. For example, some or all of the paths may be traversed in both directions.

The database management system may utilize the warehouse graph data to generate the set of candidate routes through the warehouse. In some examples, the database management system generates the set of candidate routes utilizing a technique similar to an ant colony optimization (ACO) algorithm. For example, the database management system may traverse the warehouse graph a number of times. Each traversal may result in a route for the set of candidate routes.

To traverse the warehouse graph, the database management system may set a first current node for the traversal. The first current node, for example, may be the depot node. The depot node may be connected to a number of paths leading to other nodes of the warehouse graph. Each path may have an associated path probability. The warehouse management system may select the path from the depot node that has the highest path probability and "traverse" the path by setting the current node to the node connected to the depot node by the traversed path. After traversing a path, the database management system may modify the path probability of the traversed path, for example, to reduce the probability that a subsequent route will take the same path.

After traversing a path, the database management system may then select another path to traverse based on the path probabilities of the paths connected to the new current node. This may continue until a route end condition is encountered. When the route end condition is encountered, the database management system may add one or more paths to the route to return from the current node to an end point, such as the depot node. The route, including the nodes and paths traversed, may be added to the set of candidate nodes. The database management system may generate any suitable number of routes in this manner.

The database management system may receive order data describing a plurality of orders that are to be picked at the warehouse. Each of the orders may include an order number or other indicator of the order as well as product indicators for one or more products included in the order. The number of products in an order may be referred to as an order quantity.

The database management system may generate route assignments for the orders. For example, the database management system may assign each of the orders to one of the routes from the set of candidate routes. The assignment of orders to routes may be performed to optimize, for example, the total duration of the routes. In some examples, multiple orders may be assigned to a single route. Also, in some examples, some routes from the set of candidate routes may not be assigned any orders.

From the assignments of orders to routes, the database management system may generate a set of tasks for one or more picking agents. A task may include a route and one or more orders assigned to the route. In some examples, a task may include actions that the picking agent can complete in a single instance of a route. For example, picking agents may have a maximum capacity of products that the picking agent can carry on one instance of a route (e.g., a picking agent capacity). In some examples, the picking agent capacity is determined by the size of a cart, basket, or other carrying object associated with the picking agent. For routes where the sum of products included in orders assigned to the route is less than the picking agent capacity, the database management system may generate a single task including the route and the orders assigned to the route. For routes where the sum of products included in orders assigned to the route is greater than the picking agent capacity (e.g., overloaded routes), the database management system may generate multiple tasks including the overloaded route. For example, a first task may include the overloaded route and a first portion of the orders assigned to the overloaded route. Additional tasks may include the overloaded route and a second portion of the orders assigned to the overloaded route.

The database management system may assign the tasks to picking agents. For example, the database management system may receive picking agent data describing picking agents that are available to pick the orders. Each task may be assigned to a picking agent, for example, to reduce or minimize the total duration of the picking.

In some examples, the systems and methods described herein may enable the assignment of orders to routes, the assignment of tasks to picking agents, and/or the assignment routes and orders to tasks to be structured and solved as integer programming problems and/or linear programming problems. This may enable the database management system to quickly and efficiently optimize the operation of the warehouse. For example, many enterprises already utilize a database management system and one or more databases to perform functions such as enterprise resource planning, customer relationship management, supplier relationship management, product lifecycle management, supply chain management, etc. Accordingly, utilizing a database management system in the manner described herein may be more efficient and faster than alternative methods because extract, transfer, and load operations on order data and other data used herein may already be performed by the database management system for other reasons. Also, in some examples, the database management system may be optimized to solve the types of linear or integer programming problems utilized by the systems and methods here. For example, an in-memory database, described herein, may be configured to quickly and efficiently solve linear and integer programming problems.

FIG. 1 is a diagram showing one example of an environment 100 for warehouse management. The environment 100 comprises a database management system 102 and a database 104. In some examples, the database management system 102 may be a relational database management system. Also, in some examples, described in more detail below, the database management system 104 may be an in-memory database management system.

The database management system may comprise a task assignment system 106 and an optimization engine 108. The task assignment system 106 may receive and/or access various input data and format warehouse management described herein into one or more linear programming problems. The task assignment system 106 may also call the optimization engine 108 to solve the generated integer or linear programming problems. Based on the results of the optimization engine 108, the task assignment system may generate task assignments 116. Task assignments 116 may describe tasks, which include a route through a warehouse and one or more orders including products in the orders to be picked. Task assignments 116 may also include picking agent assignment data indicating a picking agent to which or whom a task is assigned. Although the pick assignment system 106 and optimization engine 108 are shown as components of the database management system 102, in some examples, these components may be executed outside of the database management system 102. For example, one or both of the task assignment system 106 and optimization engine 108 may be implemented as client applications utilizing the database 104 through the database management system 102. Also, in some examples, one or both of the task assignment system 106 and optimization engine 108 may be implemented outside the context of a database management system 102 altogether.

The task assignment system 106 may receive various input data including, warehouse data 112, order data 110, and picking agent data 114. Warehouse data 112 may describe the warehouse to be managed. In some examples, the warehouse data 112 may be received in the form of warehouse graph data describing a warehouse graph 118 of product locations in the warehouse. For example, the graph may include a plurality of nodes and a plurality of paths interconnecting the nodes. Some of the nodes may correspond to locations in the warehouse where one or more specific products are stocked and may be picked. In some examples, one or more of the nodes are depot nodes, as described herein. Each path may represent a unique way to travel in the warehouse from one node to another. In some examples, a path may not cross any other nodes between its end nodes. That is, in some examples, paths may join only adjacent nodes. In some examples, the task assignment system 106 may derive or generate the graph.

Order data 110 may describe orders to be filled from the warehouse. Order data 110 may be received directly from a customer and/or indirectly from an order processing system. An order described by the order data 110 may include an order identifier and one or more product identifiers. The one or more product identifiers may describe one or more products for the order. In some examples, an order may also include other data such as, for example, an indication of a customer for the order, an indication of the quantity of the products in the order, etc. Picking agent data 114 may describe picking agents that are available at various times to pick products for the orders described by the order data 110. Picking agent data 114, in some examples, may also describe the picking agent capacity or capacities of the picking agents.

In some examples, some or all of the warehouse data 112, the order data 110 and/or the picking agent data 114 may be dual use data that is also used at the database 104 for reasons other than warehouse management, as described herein. For example, order data 110 may be received and incorporated into the database 104 as part of a supply chain management, supplier relationship management, or other suitable business application utilizing the database management system 102. Warehouse data 112 may be received and incorporated into the database 104 as part of a supply chain management, enterprise resource planning, or other suitable business application utilizing the database management system 102. Picking agent data 114 may be received and incorporated into the database 104 as part of payroll (for human picking agents), enterprise resource management (e.g., robot picking agents) or another suitable business application. Accordingly, in some examples, receiving the various data 110, 112, 114 may comprise accessing the data 110, 112, 114 at the database 104.

The task assignment system 106 may utilize the order data 110, warehouse data 112, and picking agent data 114 to generate the task assignments 116. The task assignment system 106 may generate and/or receive a warehouse graph 118. In some examples, the warehouse graph 118 may be part of the received warehouse data 112. In other examples, the task management system 106 may generate the warehouse graph 118 from the warehouse data 112. Examples including additional details of a warehouse graph are provided herein, for example, with respect to FIG. 3. Based at least in part on the warehouse graph 118, the task assignment system 106 may generate candidate routes 120 through the warehouse. Candidate routes 120 may each begin and end at a depot node of the warehouse graph 118 and may comprise a series of paths to be traversed by a picking agent.

The task assignment system 106 may assign orders from the order data 110 to the candidate routes 120. For example, the task assignment system 106 may format a linear or integer programming problem as descried herein and provide the linear or integer programming problem to the optimization engine 108, which may return a solution for assigning the orders to the candidate routes 120. Based at least in part on the assignment of orders to tasks, the task assignment system 106 may determine tasks 111. Tasks 111 may include a route from the routes 120 and one or more orders from the order data 110. The task assignment system 106 may assign tasks to picking agents described by the picking agent data 114. For example, the task assignment system 106 may similarly format a linear programming problem and provide the linear programming problem to the optimization engine 108. The optimization engine may return a solution including the task assignments 116 for assigning the tasks 111 to picking agents described by the picking agent data 114. The task assignments 116 may take any suitable form. For example, the task assignments 116 may include paper work slips for human picking agents, data for printing paper work slips for human picking agents, data for instructing robotic picking agents, etc.

Figure 2:
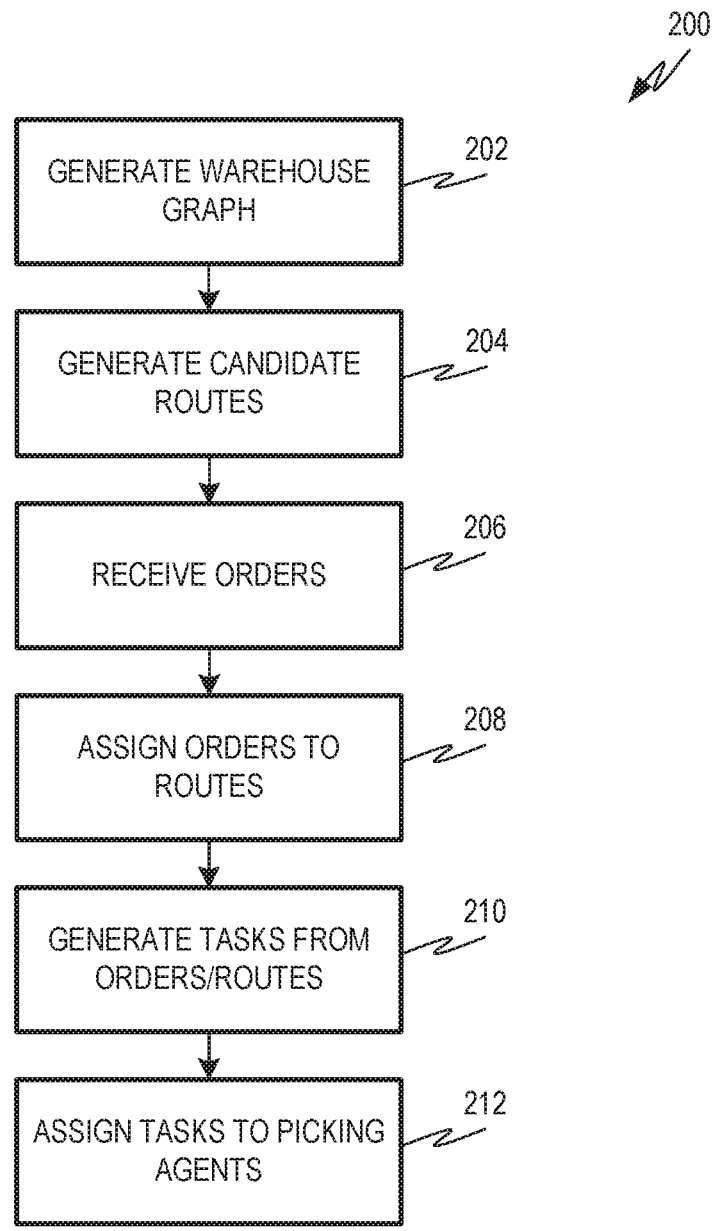
FIG. 2 is a flowchart showing one example of a process flow that may be executed by the task assignment system and/or optimization engine of FIG. 1 to manage a warehouse.

FIG. 2 is a flowchart showing one example of a process flow 200 that may be executed by the task assignment system 106 and/or optimization engine 108 to manage a warehouse. At optional operation 202, the task assignment system 106 may generate a warehouse graph for a warehouse, such as the warehouse graph 118. Additional warehouse graph examples are described herein including at FIG. 3. Generating the warehouse graph may comprise identifying locations in the warehouse where products are stocked and may be picked and any depot locations. The task assignment system 106 may generate nodes corresponding to the identified locations. These may be included in the graph as nodes. The task assignment system 106 may also identify traversable paths between the identified locations. These may be included in the warehouse graph as paths. In some examples, the operation 202 may be omitted, for example, if the warehouse data 112 already includes the warehouse graph.

At operation 204, the task assignment system 106 may generate candidate routes. The candidate routes may be generated, in some examples, utilizing a modified ant colony optimization algorithm, for example, as described herein with respect to FIG. 4. Each candidate route may comprise a series of adjacent nodes and paths there between that may be traversed by a picking agent. In some examples, each route may begin and end at a depot node of the warehouse graph, which may correspond to a depot location at the warehouse.

At operation 206, the task assignment system 106 may receive orders. Orders may be provided directly to the task assignments system 106 or, in some examples, the task assignment system 106 may access order data 110 from the database 104, for example, from a table or other location utilized for supply chain management and/or another business application managed by the database management 102 and/or a client application thereof.

At operation 208, the task assignment system 106 may assign orders to routes. For example, the task assignment system 106 may structure a linear or integer programming problem to minimize the total duration of routes for picking the orders received at operation 206. In some examples, the linear programming problem may be optimized subject to constraints based on picking agent capacity. For example, the duration of a route may be equal to the time that it takes a picking agent to traverse the route, multiplied by the number of times that the route must be traversed to pick all of the products from the assigned orders. For example, if the agent capacity is twenty (20) products and orders with a total of forty (40) products are assigned to the route, then a picking agent may traverse the route twice to pick all of the assigned orders. The task assignment system 106, in some examples, may incorporate the linear programming problem into input parameters for the optimization engine 108. The optimization engine 108 may act on the input parameters and provide a solution that includes assignments of orders to particular routes. In some examples, less than all of the routes will have assigned orders.

At operation 210, the task assignment system 106 may generate a set of tasks from the routes and assigned orders. Each task may include a route and one or more orders assigned to the route. Some routes may have assigned orders with a number of products less than the picking agent capacity. Routes of this type may translate to one respective task in the set of tasks. Some routes may be overloaded, for example, when orders assigned to the routes have a number of products greater than the picking agent capacity. This indicates that the route is to be traversed multiple times. In some examples, overloaded routes may translate to multiple tasks. For example, the task assignment system 106 may split the orders assigned to an overloaded route to form multiple tasks, with each task including the overloaded route and a portion of the assigned orders having a number of products less than the picking agent capacity. Any suitable technique may be used to split the assigned orders for the overloaded route including, for example, a greedy splitting technique.

In some examples, instead of simply splitting the assigned orders of overloaded tasks, the task assignment system 106 may create candidate tasks for the routes having assigned orders, where overloaded routes correspond to multiple candidate tasks. Candidate tasks may include tasks that do not (yet) have assigned orders. In this way, task generation may be expressed as a linear programming problem to optimize the total duration of the tasks. The optimization engine 108 may be used to assign orders to the candidate tasks to reduce or minimize the total duration.

At operation 212, the task assignment system 106 may assign the tasks to picking agents. For example, the task assignment system 106 may express task assignment as a linear programming problem to optimize (e.g., in this case minimize) the total time spent by picking agents to perform the tasks. The optimization engine 108 may return a result that includes assignments of tasks to particular picking agents.

Figure 3:
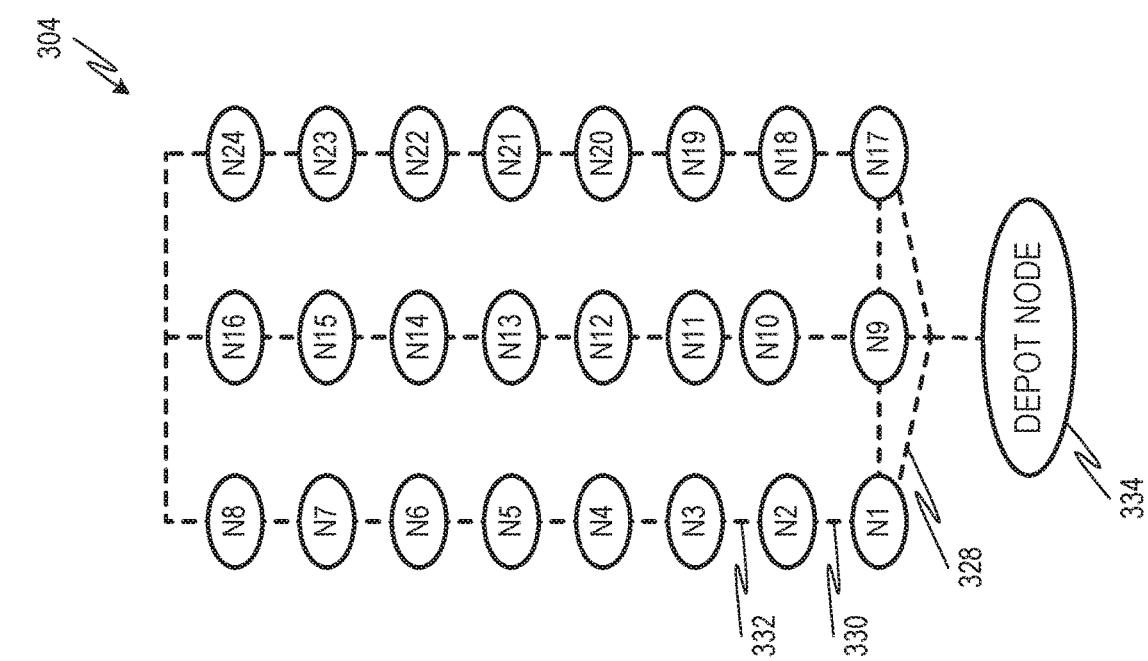
FIG. 3 is a diagram showing an example warehouse map and an example warehouse graph corresponding to the warehouse map.
Figure 3:
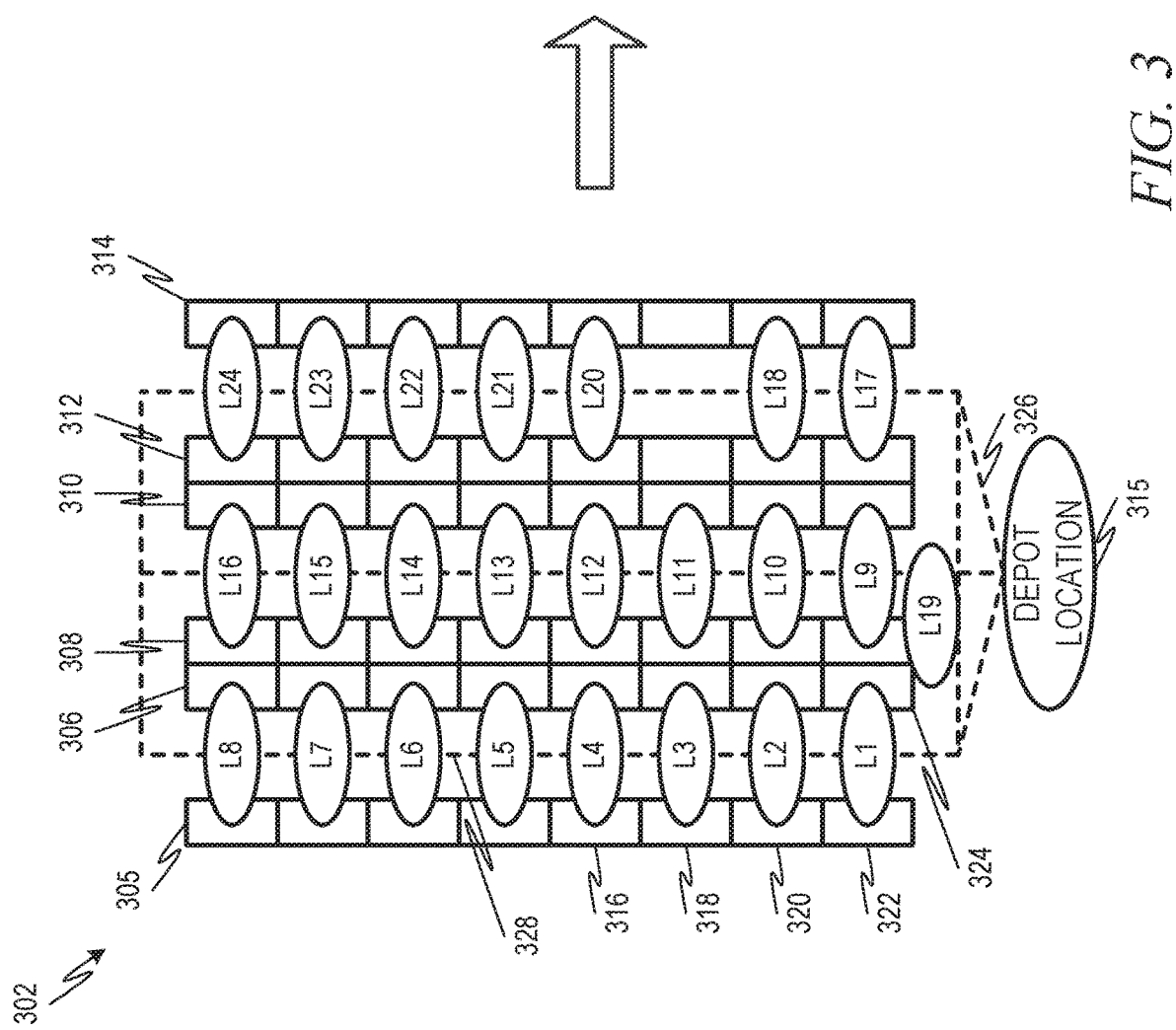

FIG. 3 is a diagram showing an example warehouse map 302 and an example warehouse graph 304 corresponding to the warehouse map 302. Referring first to the warehouse map 302, the warehouse includes example product rows 305, 306, 308, 310, 312, 314. Product rows 305, 306, 308, 310, 312, 314 may be or include, shelving units, bins, floor space, or any other suitable mechanism for storing and/or locating products. Product rows 305, 306, 308, 310, 312, 314 in some examples, may include product sites. Example product sites 316, 318, 320, 322, 324 are labeled, although additional product sites are shown. Each product site, including 305, 306, 308, 310, 312, 314, may be the storage place for one or more products. In some examples where a product site includes a shelving unit, the product site may be the location of multiple products (e.g., at different shelves or levels). Also, in some examples, a product site may correspond to multiple products, for example, if the products are otherwise within reach of a picking agent at the product site.

The warehouse map 302 also shows picking locations labeled L1-L24 and a depot location 315. Each of these picking locations corresponds to one or more than one of the product sites. For example, the picking location L1 is in an aisle between product row 305 and product row 306. Accordingly, the picking location L1 corresponds to product site 322 and product site 324. Other picking locations L2-L24 may similarly correspond one or more than one product site. Paths between picking locations L1-L24 are shown in the warehouse map 302 as dashed lines. Paths may extend between two picking locations that a picking agent may travel directly between. For example, path 326 is shown between the depot location 315 and the picking location L17 because a picking agent may travel directly between the depot location 315 and the picking location L17. Another example path is shown between the picking location L5 and the picking location L6 because a picking agent may travel directly between the picking locations L5 and L6. No paths are shown between picking locations that a picking agent may not travel directly between. For example, a picking agent may not be able to walk through the picking rows 306, 308 and, therefore, there is no path between the picking locations L7 and L15, although a picking agent may take a route that moves from L7 to L15, for example, by traversing paths between L7 and L8, between L8 and L16, and finally between L16 and L15.

In the warehouse graph 304, the picking locations L1-L24 are represented as nodes N1-N24. The depot location 315 may be represented as a depot node 334. Each node N1-N24 and 334 may be associated with one or more products. For example, the node N1, corresponding to the picking location L1, may be associate with products located at the product sites 322 and 324. The warehouse graph 304 may also include paths between the nodes N1-N24 and 334, for example, corresponding to the paths in the warehouse map 302. For example, a path 328 may connect the depot node 334 to the node N1. An example path 330 may connect the node N to the node N2 and an example path 332 may connect the node N2 and the node N3. Additional paths are shown as dashed lines. In some examples, the warehouse graph 304 may be undirected, meaning that the paths between the nodes N1-N24 and 334 may be traversed by picking agents in either direction.

In some examples, a warehouse graph may be stored at the database 104, for example, in table form. An example table form for expressing a warehouse graph is proved below at the table WAREHOUSE_GRAPH:

| WAREHOUSE_GRAPH | | |
|---|---|---|
| FROM_NODE_ID | TO_NODE_ID | DURATION |

The WAREHOUSE_GRAPH table includes example columns "FROM_NODE_ID," "TO_NODE_ID," and "DURATION." Paths may be expressed in the example WAREHOUSE GRAPH table as records, with each record having fields including values for the columns. Record fields in the FROM_NODE_ID and TO_NODE_ID columns may indicate the source and destination nodes of a path, respectively. In examples where the graph is undirected, it may be possible to move from the source node to the destination node, or in reverse from the destination node to the source destination. In the example WAREHOUSE_GRAPH table, records for the paths may also include a duration field corresponding to the DURATION column. The duration for a path may indicate the time that it would take a picking agent to travel the path.

Figure 4:
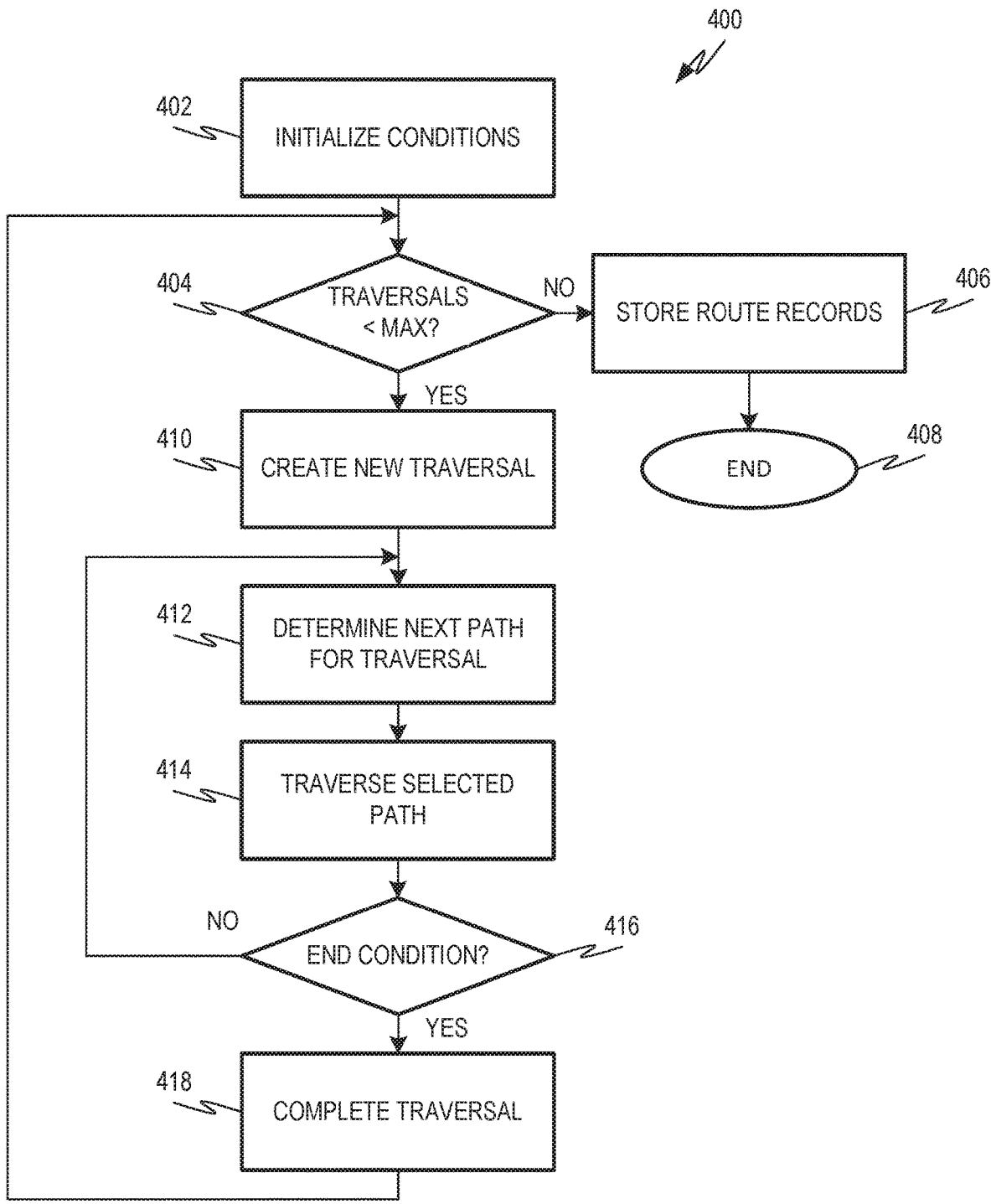
FIG. 4 is a flowchart showing one example of a process flow that may be executed by the task assignment system of FIG. 1 to generate a set of candidate routes from a warehouse graph.

FIG. 4 is a flowchart showing one example of a process flow 400 that may be executed by the task assignment system 106 to generate a set of candidate routes from a warehouse graph. The process flow 400 describes a process that, in some examples, may be similar to an ant colony optimization (ACO) algorithm. At operation 402, the task assignment system 106 may initialize conditions for the process flow 400. This may include, for example, determining how many traversals of the warehouse graph will be performed. In some examples, each traversal of the warehouse graph may generate a corresponding candidate route, so the number of traversals may also be the number of candidate routes. In some examples, initializing conditions at operation 402 may also include determine end conditions for the traversals. For example, a traversal may continue, as described herein, until an end condition is met.

At operation 404, the task assignment system 106 may determine if the number of completed traversals is less than the total number of traversals to be completed. If the number of completed traversals is less than the total number of traversals to be completed, the task assignment system may create a new traversal at operation 410. A new traversal may begin at a designated start node of the warehouse graph. In the examples described herein, all traversals (and therefore all candidate routes) may begin at the depot node. The depot node may be an initial current node for the traversal.

At operation 412, the task assignment system 106 may determine a next path from the current node. The next path may be selected from the paths that meet the current node. Each path may have an associated path probability and, in some examples, the next path may be selected from the paths meeting the current node randomly or pseudo-randomly considering the path probabilities. For example, a sum of the path probabilities for paths meeting the current node may be one or may be normalized to one by the task assignment system 106. In some examples, the task assignment system 106 may utilize a set of numbers. Ranges of the set of numbers may be assigned to each path meeting the current node, for example, based on the corresponding path probabilities. For example, consider an example where a first path and a second path meet the current node where the first path has a path probability that is twice the second path. The task assignment system 106 may assign two-thirds of the set of numbers to the first path and one-third to the second path. Then the task assignment system 106 may randomly select a number from the set of numbers. If the randomly selected number is assigned to the first path, then the task assignment system 106 may select the first path. If the randomly selected number is assigned to the second path, then the task assignment system 106 may select the second path.

At operation 414, the task assignment system 106 may traverse the selected path. This may include, for example, updating the current node of the traversal to the node at the other end of the selected path. It may also include updating the path probability of the selected path. In some examples, the task assignment system 106 may reduce the path probability of the selected path such that subsequent traversals of the warehouse graph are less likely to select the same path.

At operation 416, the task assignment system 106 may determine whether the end condition for the traversal is met. The end condition may be, for example, a number of paths to be traversed during the traversal. In some examples, the end condition may be determined at the beginning of a traversal. The end condition, in some examples, may be a randomly selected number of paths below a maximum number. The maximum number in some examples, may be twice the longest possible route in the warehouse graph. In some examples, the maximum number is twice the total number of nodes.

If the end condition is not met, the task assignment system 106 may return to operations 412 and 414 to select and traverse a next path from the new current node. If the end condition is met, the task assignment system 106 may complete the traversal at operation 418. Completing the traversal may include, for example, returning to the depot node or other end location. For example, a candidate route may not end in the middle of the warehouse. The task assignment system 106 may add additional paths and nodes to the traversal to move to the end location (e.g., the depot node). In some examples, the task assignment system 106 may also store a description of the traversal, including paths traversed, as a candidate route.

Upon completing a traversal at operation 418, the task assignment system 106 may return to operation 404 and determine whether the number of completed traversals is still less than the maximum number of traversals. If the number of completed traversals is still less than the maximum number of traversals, then the task assignment system 106 may proceed to operation 410 and perform another traversal, for example, as described. If the number of completed traversals is not less than the maximum number of traversals, then the task assignment system 106 may, at operation 406, store route records generated at operation 418 as the set of candidate routes and end at operation 408.

The result of the process flow 400 may be the set of candidate routes. The set of candidate routes, in some examples, may be stored at the database 104. An example table form for storing the set of candidate routes is provided by an example ROUTE_DETAIL table below:

| ROUTE_DETAIL | | | |
| --- | --- | --- | --- |
| ROUTE_ID | SEQUENCE | NODE_ID | DURATION |

Records in the example ROUTE_DETAIL table may correspond to nodes that are part of a route. For example, a record may have a record field in the column ROUTE_ID that uniquely identifies a candidate route. A record value in the SEQUENCE column may indicate the sequence of the node in the candidate route (e.g., the first node in the candidate route, the fifth node in the candidate route, etc.). A record value in the NODE_ID column may uniquely identify the node. A record value in the DURATION column may indicate the duration of the last move to the node identified by the NODE_ID record.

Another example table ROUTE_INFO below shows a table form for storing the set of candidate routes:

| ROUTE_INFO | | |
| --- | --- | --- |
| ROUTE_ID | CAPACITY | DURATION |

Records in the example ROUTE_INFO table may correspond to candidate routes. For example, a candidate route record may have a field in the ROUTE_ID column that uniquely identifies the candidate route. In some examples, the ROUTE_ID field value may be a foreign key corresponding to the similar field in ROUTE_DETAIL table. A candidate route record may also have a field value in the CAPACITY column that indicates a picking agent capacity for the route. In some examples, all candidate routes may have the same picking agent capacity. In other cases, other candidate routes will have different picking agent capacities. For example, one candidate route may include large products than another, causing it to have a lower picking agent capacity. In another example one candidate route may be accessible only to smaller carts, trolleys, or other picking agent tools, making that candidate route's capacity smaller. A candidate route record may also have a DURATION field value in the DURATION column indicating a duration of the route. The duration of a candidate route may be the sum of the durations of the paths on the route.

Figure 5:
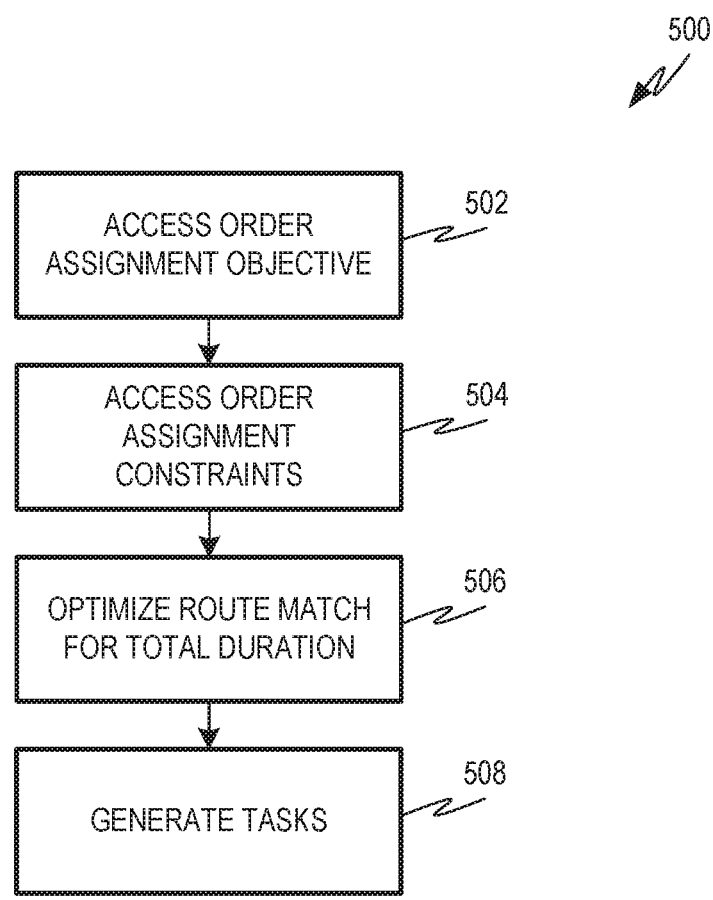
FIG. 5 is a flowchart showing one example of a process flow that may be executed by the task assignment system and/or the optimization engine of FIG. 1 to assign orders to candidate routes.

FIG. 5 is a flowchart showing one example of a process flow 500 that may be executed by the task assignment system 106 and/or the optimization engine 108 to assign orders to candidate routes. For example, the process flow 500 may utilize the set of candidate routes generated as described above with respect to FIG. 4. In some examples, data regarding the candidate routes is provided in a form similar to or identical to that shown in example ROUTE_DETAIL and ROUTE_INFO tables above.

At operation 502, the task assignment system 106 may generate an order assignment objective. The order assignment objective may be a value to increase/maximize or decrease/minimize. For example, the order assignment objective may be to complete the picking of all of the orders in the shortest time, with the fewest number of picking agents, etc. At operation 504, the task assignment system 104 may generate order assignment constraints. The order assignment constraints may describe the conditions under which the order assignment objective is to be achieved. For example, the picking agent capacity may be an order assignment constraint.

An examples statement of an order assignment objective and constraints are provided below by Equations [1]-[3]:

$$\min \cdot \sum_r y_r \quad [1]$$

$$\text{s.t. IF} \sum_o x_{o,r} \in ((k-1)*C_r, k*C_r] \quad [2]$$

$$\text{THEN } y_r = k*D_r, k = 0, 1, \ldots$$

$$\sum_r x_{o,r} = 1 \quad [3]$$

Values in Equations [1]-[3] are described by TABLE 1 below:

TABLE 1

| | |
|---|---|
| $x_{o,r}$ | Assign order o to route r |
| $y_r$ | Duration for decided orders on r (including multiple move) |
| $C_r$ | Picking agent capacity for route r |
| $D_r$ | Duration for route r |
| $q_o$ | Product quantity for order o |

Equations [1]-[3] may show an order assignment object that minimizes the sum of the pick time durations over all orders (Equation [1]). Constraints may be that if the picking agent capacity for a route is less than the sum of the products of orders assigned to the route, then the route may have to be traveled multiple times (Equation [2]). Also, each order may be assigned to one route (Equation [3]). Equations [4]-[5] show an alternate formulation of the constraints expressed by Equation [2]:

$$\text{s.t. } y_r = \begin{cases} 0, & X_r = 0 \\ D_r, & 0 < X_r \le C_r \\ 2D_r, & C_r < X_r \le 2C_r \\ \vdots & \end{cases} \quad [4]$$

$$X_r = \sum_o q_o x_{o,r} \quad [5]$$

In some examples, the task management system 106 may modify the objective and constraints from the form shown in Equations [1]-[5] to a form suitable for the optimization engine 108. For example, the task management system 106 may introduce breakpoint variables $a_0, a_1, a_2, \ldots$ to correspond to multiples of the picking agent capacity for the candidate routes, $0, C_r, 2C_r, \ldots$ as well as binary variables $u_0, u_1, u_2 \ldots$. The result is given by Equations [6]-[10] below]:

$$s.t. y_r = \Sigma_i i * D_r * u_i \quad [6]$$

$$\Sigma_i a_i u_i \le X_r \le \Sigma_i a_{i+1} u_i \quad [7]$$

$$X_r = \Sigma_o x_{o,r} \quad [8]$$

$$\Sigma_r x_{o,r} = 1 \quad [9]$$

$$\Sigma_i u_i = 1 \quad [10]$$

For example, objective and constraints, for example, as expressed by Equations [1] and [6]-[10] or in another suitable format, may represent a linear or integer programming problem in a form that may be provided to the optimization engine 108. In some examples, objective and constraints may be expressed in table form at the database 104. The task assignment system 106 may provide the order assignment objective and constraints to the optimization engine 108, which may solve the resulting linear or integer programming problem at operation 506 and return a set of values for the binary variable $x_{o,r}$ over all orders and candidate routes. For example, the binary variable $x_{o,r}$ may indicate that an order is assigned to a particular candidate route if it is asserted for the combination of the order and the candidate route. The optimization engine 108 may solve the linear programming problem using any suitable technique including, for example, a simplex method. Also, in some examples, the optimization may be expressed as an integer programming. The optimization engine 108 may solve integer programming problems, for example, utilizing a branch & bound technique or other suitable method.

An example format for results of the operation 506 is given in an example ORDER_ROUTE table below:

| ORDER_ROUTE | | |
|---|---|---|
| ORDER_ID | ROUTE_ID | QUANTITY |

Records in the example ORDER_ROUTE may have a field in the ORDER_ID column uniquely identifying an order for the record. A field in the ROUTE_ID column may uniquely identify a route from the set of candidate routes to which the order indicate by the ORDER_ID is matched. A field in the QUANTITY column may indicate a number of products in the order.

At operation 508, the task assignment system 106 may generate tasks from the candidate routes and assigned orders. Tasks may include a route and at least one order assigned to the route. For candidate routes that are not overloaded (e.g., the sum of products in orders assigned to the route is less than the picking agent capacity), the task assignment system 106 may create a single task including the candidate route and its assigned orders. For candidate routes that are overloaded, the task assignment system 106, in some examples, may utilize greedy splitting or another suitable technique to make two or more tasks from the same overloaded route.

In some examples, instead of merely splitting orders for overloaded routes, the task assignment system 106 may perform another optimization operation. For example, the task assignment system 106 may generate a set of candidate tasks. Each candidate task may include a route and may be assigned one or more of the orders during the optimization. Routes that were not overloaded may be added to the set of candidate tasks once. Routes that were overloaded may be added to the set of candidate tasks more than once. For example, an overloaded route may be added to the set of candidate tasks a number of times equivalent to the number of times that the route would be run to pick all of the orders assigned to the route. Each candidate task, including tasks with different instances of an overloaded route, may be given a unique identification.

The task assignment system 106 may determine an order assignment objective for the candidate tasks and constraints for the same. An example assignment object and constraints are provided by Equations [11]-[14] below:

$$\min \cdot \sum_t y_t \quad [11]$$

$$\text{s.t.} \quad y_t = \begin{cases} 0, & X_t = 0 \\ D_t, & 0 < X_t \le C_t \end{cases} \quad [12]$$

$$X_t = \sum_o q_o x_{o,t} \quad [13]$$

$$\sum_t x_{o,t} = 1 \quad [14]$$

The objective, as indicated by Equation [11], is to minimize the sum of the durations for each task. The constraints are that the duration of a candidate task is zero if no orders are assigned and equal to the duration of the corresponding route if the sum of products in orders assigned to the task is greater than zero and less than the picking agent capacity (Equations [12] and [13]). Another constraint is that an order is assigned to only one task (Equation [14]). An alternative expression of the conditions in Equations [12] is given by Equations [15]-[16] below, which incorporate the binary variable $u_t$:

$$s.t. y_t = D_t * u_t \quad [15]$$

$$0 \le X_t \le C_t * u_t \quad [16]$$

Values in Equations [11]-[16] are described by TABLE 2 below:

TABLE 2

| | |
|---|---|
| $x_{o,t}$ | Assign order o to task t |
| $y_t$ | Duration for decided orders on task t |
| $C_t$ | Picking agent capacity for task t |
| $D_t$ | Duration for task t |
| $q_o$ | Item quantity per order |

In some examples, the task assignment system 106 may provide the objective and constraints to the optimization engine 108, which may provide a solution for $x_{o,t}$ that includes an assignment of the orders to the candidate tasks. Candidate tasks with one or more assigned orders may become tasks that are ultimately assigned to picking agents.

An example table form showing how results of the operation 508 may be presented and/or stored is provided below in an example TASK_INFO table:

| TASK_INFO | | | |
|---|---|---|---|
| TASK_ID | ORDER_ID | ROUTE_ID | DURATION |

Records in the example TASK_INFO may describe tasks determined at operation 508. For example, a field in the TASK_ID column may uniquely identify a task. A field in the ORDER_ID column may uniquely identify an order that is part of the task. For example, the ORDER_ID field may include a foreign key referencing the example ORDER_MOVE table above. A record in the ROUTE_ID column may uniquely identify a route to which the order indicated at the ORDER_ID field is assigned. A record in the DURATION column may identify a duration of the task indicated by the TASK ID.

Figure 6:
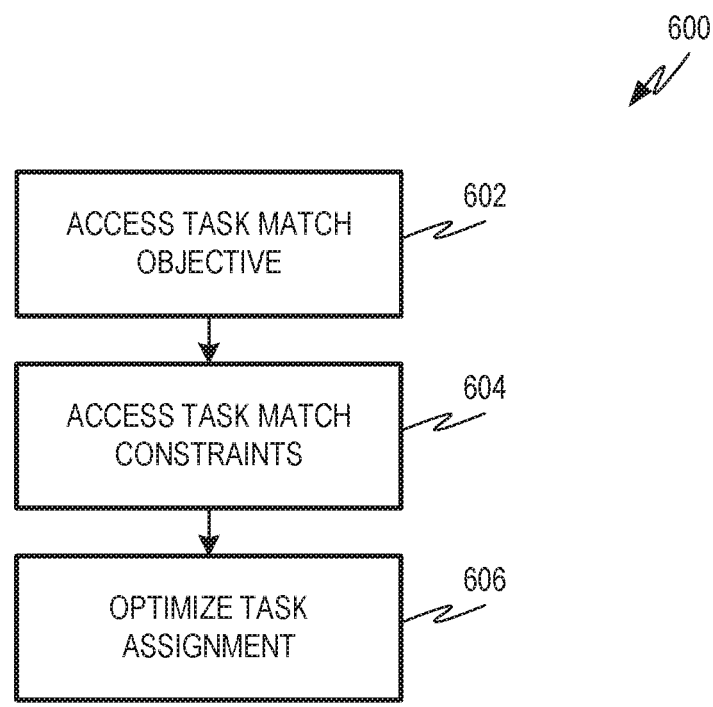
FIG. 6 is a flowchart showing one example of a process flow that may be executed by the task assignment system and/or the optimization engine of FIG. 1 to assign tasks to picking agents.

FIG. 6 is a flowchart showing one example of a process flow 600 that may be executed by the task assignment system 106 and/or the optimization engine 108 to assign tasks to picking agents. At operation 602, the task assignment system 106 may access or determine a task match objective. For example, the task assignment system 106 may access or determine a task match objective to minimize the duration of the longest task. At operation 604, the task assignment system 106 may access task assignment constraints. For example, each task may be assigned to only one picking agent.

The equations below show an example objective (Equation [17]) and an example constraint (Equation [18]):

$$\min \cdot \max_j \left\{ \sum_i p_j d_i z_{i,j} \right\} \quad [17]$$

$$\text{s.t.} \sum_j z_{i,j} = 1 \quad [18]$$

For example, Equation [17] an objective to assign the tasks to the available picking agents in order to reduce or minimize the total duration of the tasks. Since picking agents may be able to work in parallel, the total duration of the tasks may be the maximum duration $d_i$ for a task among all picking agents. For example, $z_{i,j}$ may be the decision variable to assign a task i to picking agent j and $p_j*d_i$ may be the expected duration of task i done by picking agent j. Equation [18] indicates the constraint that each task i is assigned to only one picking agent j. Another statement of an objective and constraints equivalent to Equations [17]-[18] is given by Equations [19]-[21] below:

$$\min f \quad [19]$$

$$s.t. \Sigma_j z_{i,j} = 1 \quad [20]$$

$$\Sigma_i p_j d_i z_{i,j} \le f \quad [21]$$

For example, the objective is to find a minimum value for the variable f, (Equation [19]). The minimum value may be an absolute or local minimum. The constraints are that each task is assigned to one picking agent (Equation [20]) and that maximum task duration is less than f (Equation [21]).

At operation 606, the task assignment system 106 may optimize the assignment of tasks to picking agents, for example, by requesting that the optimization engine 108 optimize according to the objective and constraint described above. The result may be the task assignments 116 described above.

Inputs utilized by the process flow 600 may include, for example, task information provided by the example TASK_INFO table above along with picking agent information that may be organized as indicated by the example AGENT_INFO table below:

| AGENT_INFO | | |
|---|---|---|
| AGENT_ID | STATUS | PERFORMANCE |

For example, records in the example AGENT_INFO table may correspond to picking agents that may be available to perform the tasks described herein. A field in the AGENT_ID column may uniquely identify a picking agent. A field in the STATUS column may indicate a status of the agent (e.g., available to perform tasks, not available to perform tasks). A record in the PERFORMANCE column may indicate the performance of the indicated picking agent. In some examples, the performance may be expressed as a percentage or portion of the task duration that will be required for the picking agent to perform the task. For example, an agent with a performance over 100% will take longer than the task duration while an agent with a performance under 100% will not take as long as the task duration.

In some examples, a result of the process flow 600 may be expressed in a table, such as the example TASK_ASSIGN table below. For example, the example TASK_ASSIGN table shows one example way that the task assignments 116 may be formatted:

| TASK_ASSIGN | | |
|---|---|---|
| AGENT_ID | TASK_ID | EXPECTED_FINISH_TIME |

Records in the example TASK_ASSIGN may identify the assignment of a task to a picking agent. For example, a field in the AGENT_ID column may indicate the picking agent to whom the task has been assigned. In some examples, the AGENT_ID column may include foreign keys linking to the example AGENT_INFO above. A field in the TASK_ID column may indicate the task that has been assigned to the agent. For example, the TASK_ID column may include foreign keys that reference the example TASK_INFO table described above. A field in the EXPECTED_FINISH_TIME may indicate when the picking agent is scheduled to complete the assigned task, for example, based a duration of the task and a performance of the picking agent.

Figure 7:
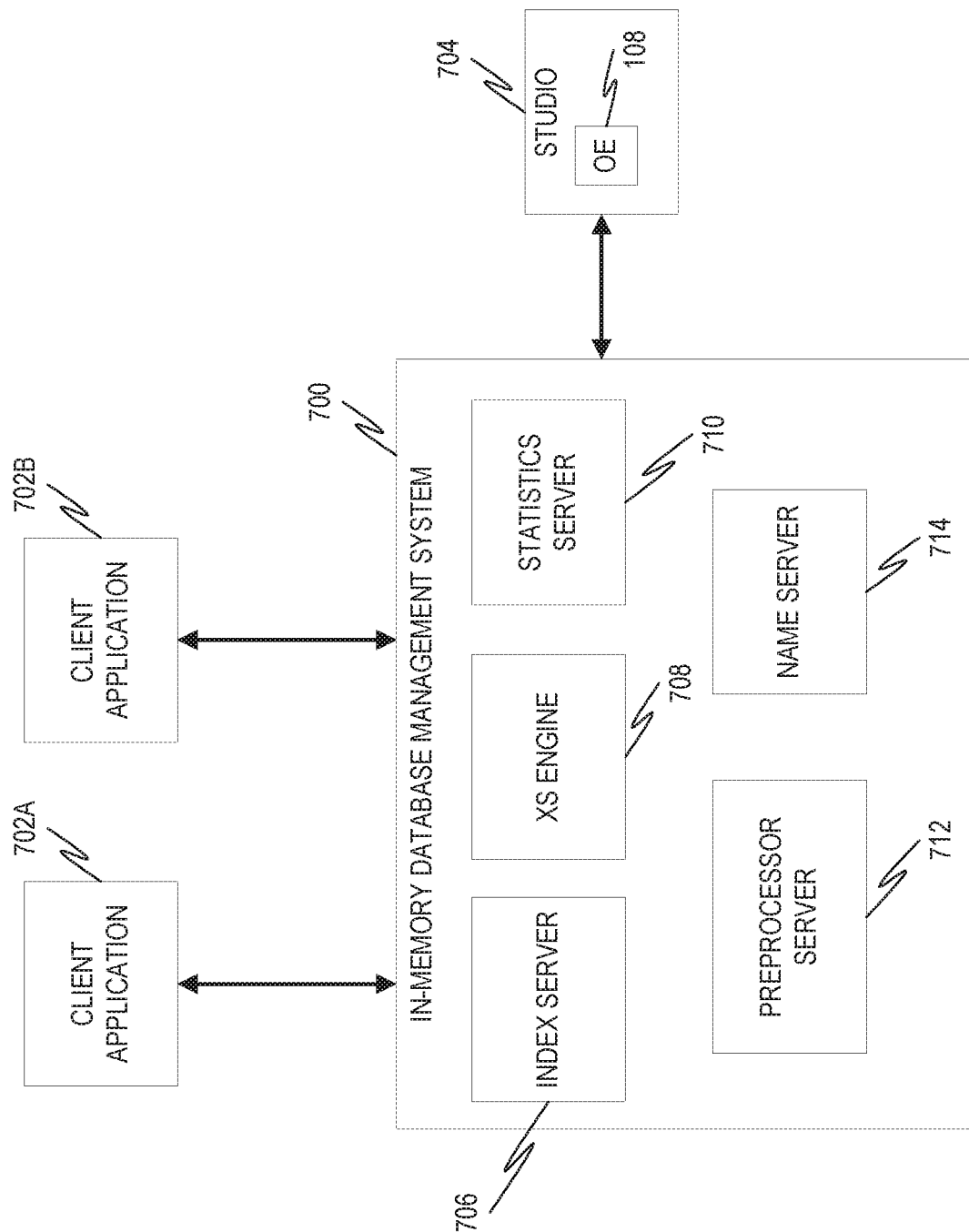
FIG. 7 is a diagram illustrating an example of an in-memory database management system that may be used to implement warehouse management.

FIG. 7 is a diagram illustrating an example of an in-memory database management system 700 that may be used to implement warehouse management, for example, as described herein. An in-memory database stores data primarily at main memory, such as a random access memory (RAM). This is different than databases that primarily employ a disk storage mechanism. In some examples, the database management system 700 may be or include an example of the HANA system from SAP SE of Walldorf, Germany. Although various features of warehouse management are described herein in the context of an in-memory database, warehouse management may be generally performed at any suitable database management system. For example, the database management system 102 of FIG. 1, in some examples, may be implemented in a manner similar to that of the database management system 700.

The in-memory database management system 700 may be coupled to one or more client applications 702A, 702B. For example, the client applications 702A, 702B may perform one or more functions utilizing data from the database (e.g., database 104) including, for example, presenting a user interface (UI) to one or more users, etc. In some examples, a client application 702A, 702B may implement one or both of the task assignment system 106 and optimization engine 108, as described herein. The client applications 702A, 702B may communicate with the in-memory database management system 700 through a number of different protocols, including Structured Query Language (SQL), Multidimensional Expressions (MDX), Hypertext Transfer Protocol (HTTP), Representational State Transfer (REST), Hypertext Markup Language (HTML).

FIG. 7 also shows a studio 704 that may be used to perform modeling by accessing the in-memory database management system 700. In some examples, the studio 704 may allow complex analysis to be performed on data drawn not only from real time event data and windows, but also from stored database information. In some examples, the studio 704 may be or include the optimization engine 108 described herein.

The in-memory database management system 700 may comprise a number of different components, including an index server 706, an XS engine 708, a statistics server 710, a preprocessor server 712, and a name server 714. These components may operate on a single computing device, or may be spread among multiple computing devices (e.g., separate servers). The index server 706 contains the actual data and the engines for processing the data. It may also coordinate and uses the other servers.

The XS engine 708 allows clients to connect to the in-memory database management system 700 using web protocols, such as Hypertext Transfer Protocol (HTTP). Although the XS engine 708 is illustrated as a component of the in-memory database management system 700, in some examples, the XS engine may be implemented as one or more Application Program Interfaces (APIs) and/or services positioned between the client applications 702A, 702B and the in-memory database management system 700.

The statistics server 710 collects information about status, performance, and resource consumption from all the other server components. The statistics server 710 can be accessed from the studio 704 to obtain the status of various alert monitors.

The preprocessor server 712 is used for analyzing text data and extracting the information on which the text search capabilities are based.

The name server 714 holds information about the database topology. This is used in a distributed system with instances of the database on different hosts. The name server 714 knows where the components are running and which data is located on which server. In an example embodiment, a separate enqueue server may operate in the manner described above with respect to enqueue servers, specifically with regard to creating and managing light-weight enqueue sessions.

Figure 8:
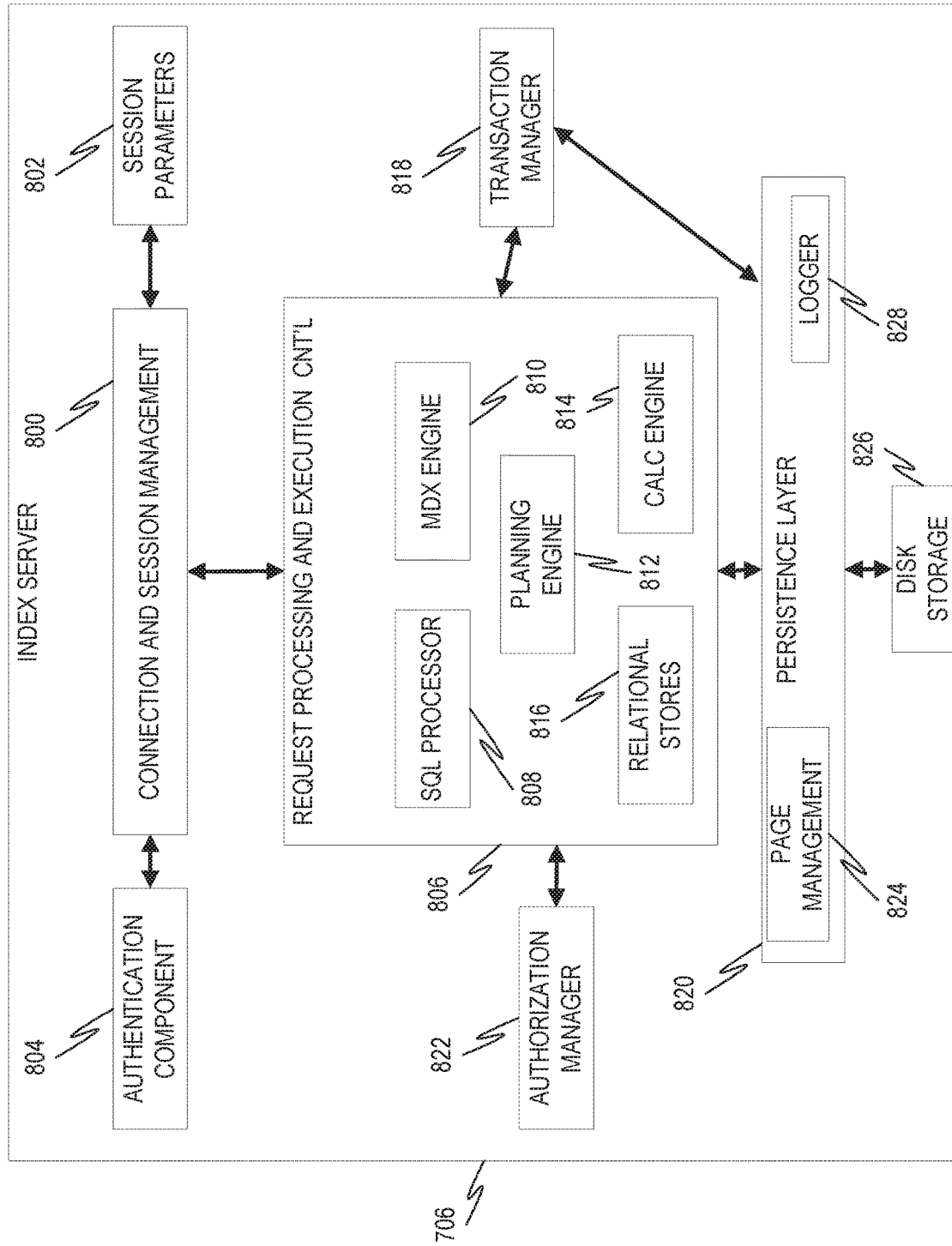
FIG. 8 is a diagram illustrating an example of the index server of FIG. 7.

FIG. 8 is a diagram illustrating an example of the index server 706. Specifically, the index server 706 of FIG. 7 is depicted in more detail. The index server 706 includes a connection and session management component 800, which is responsible for creating and managing sessions and connections for the database clients (e.g. client applications 702A, 702B). Once a session is established, clients can communicate with the database system using SQL statements and/or natural language queries. For each session, a set of session parameters 802 may be maintained, such as auto-commit, current transaction isolation level, etc. Users (e.g., system administrators, developers) may be authenticated by the database system itself (e.g., by logging in with log-in information such as a user name and password, using an authentication component 804) or authentication can be delegated to an external authentication provider such as a Lightweight Directory Access Protocol (LDAP) directory.

Client requests can be analyzed and executed by a set of components summarized as request processing and execution control 806. An SQL processor 808 checks the syntax and semantics of the client SQL statements and generates a logical execution plan. Multidimensional expressions (MDX) is a language for querying and manipulating multidimensional data stored in OLAP cubes. As such, an MDX engine 810 may be provided to allow for the parsing and executing of MDX commands. A planning engine 812 allows applications to execute basic planning operations in the database layer. One such operation is to create a new version of a dataset as a copy of an existing dataset, while applying filters and transformations.

A calculation engine 814 implements the various SQL script and planning operations. The calculation engine 814 creates a logical execution plan for calculation models derived from SQL script, MDX, planning, and domain-specific models. This logical execution plan may include, for example, breaking up a model into operations that can be processed in parallel. The data is stored in relational stores 816, which implement a relational database in main memory. Each SQL statement may be processed in the context of a transaction. New sessions are implicitly assigned to a new transaction. A transaction manager 818 coordinates database transactions, controls transactional isolation, and keeps track of running and closed transactions. When a transaction is committed or rolled back, the transaction manager 818 informs the involved engines about this event so they can execute needed actions. The transaction manager 818 also cooperates with a persistence layer 820 to achieve atomic and durable transactions.

An authorization manager 822 is invoked by other database system components to check whether the user has the specified privileges to execute the requested operations. The database system allows for the granting of privileges to users or roles. A privilege grants the right to perform a specified operation on a specified object. The persistence layer 820 ensures that the database is restored to the most recent committed state after a restart and that transactions are either completely executed or completely undone. To achieve this goal in an efficient way, the persistence layer 820 uses a combination of write-ahead logs, shadow paging, and save points. The persistence layer 820 also offers a page management interface 824 for writing and reading data to a separate disk storage 826, and also contains a logger 828 that manages the transaction log. Log entries can be written implicitly by the persistence layer 820 when data is written via the persistence interface or explicitly by using a log interface.

Figure 9:
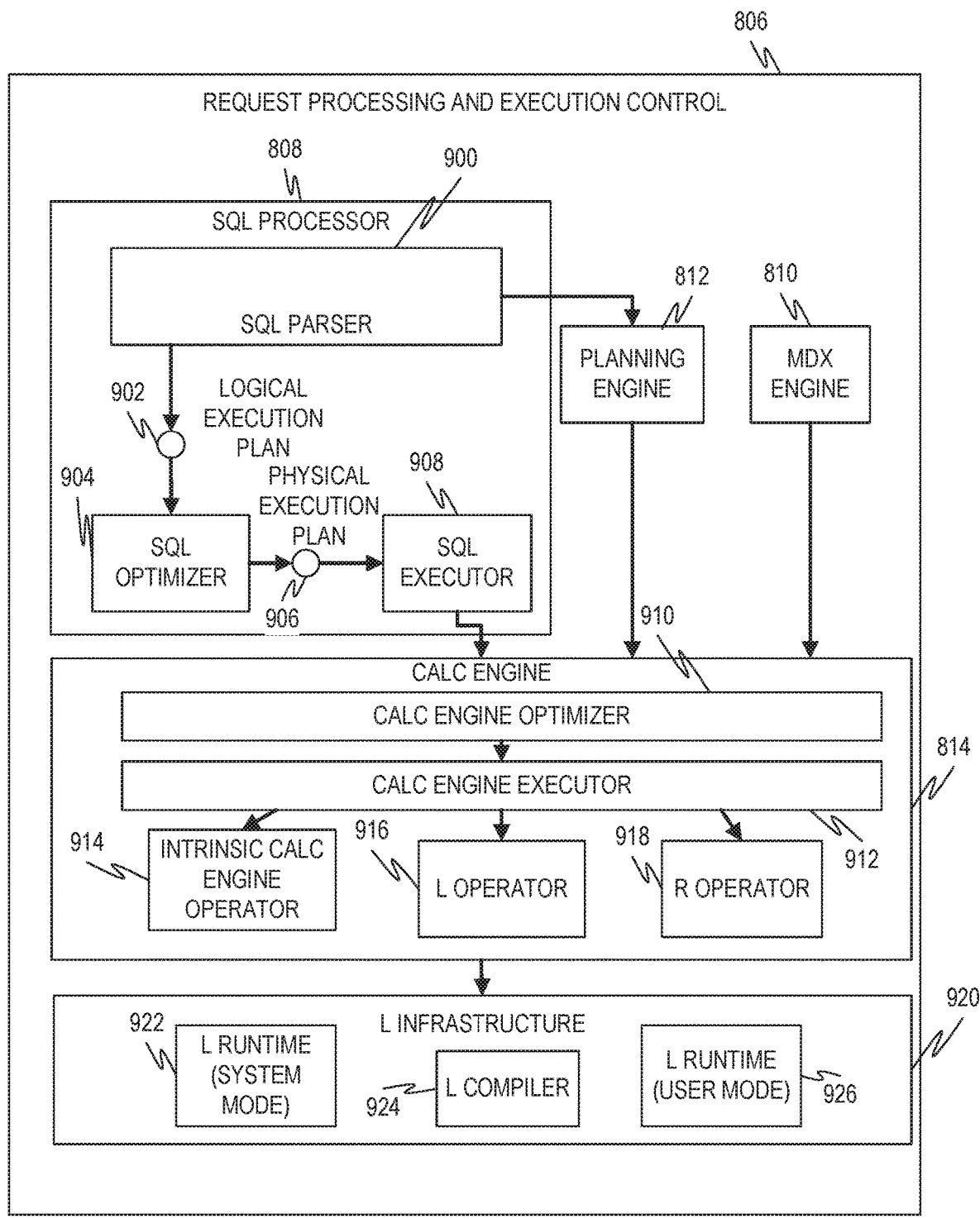
FIG. 9 is a diagram illustrating one example of the request processing and execution control of FIG. 8.

FIG. 9 is a diagram illustrating one example of the request processing and execution control 806. This diagram depicts the request processing and execution control 806 of FIG. 8 in more detail. The SQL processor 808 contains an SQL parser 900X), which parses the SQL statement and generates a logical execution plan 902, which it passes to an SQL optimizer 904. The SQL optimizer 904 optimizes the logical execution plan 902 and converts it to a physical execution plan 906, which it then passes to a SQL executor 908. The calculation engine 814 implements the various SQL script and planning operations, and includes a calc engine optimizer 910, which optimizes the operations, and a calc engine executor 912, which executes the operations, as well as an intrinsic calc engine operator 914, an L operator 916, and an R operator 918.

An L infrastructure 920 includes a number of components to aid in the running of L procedures, including an L-runtime (system mode) 922, an L compiler 924, and an L-runtime (User mode) 926.

Figure 10:
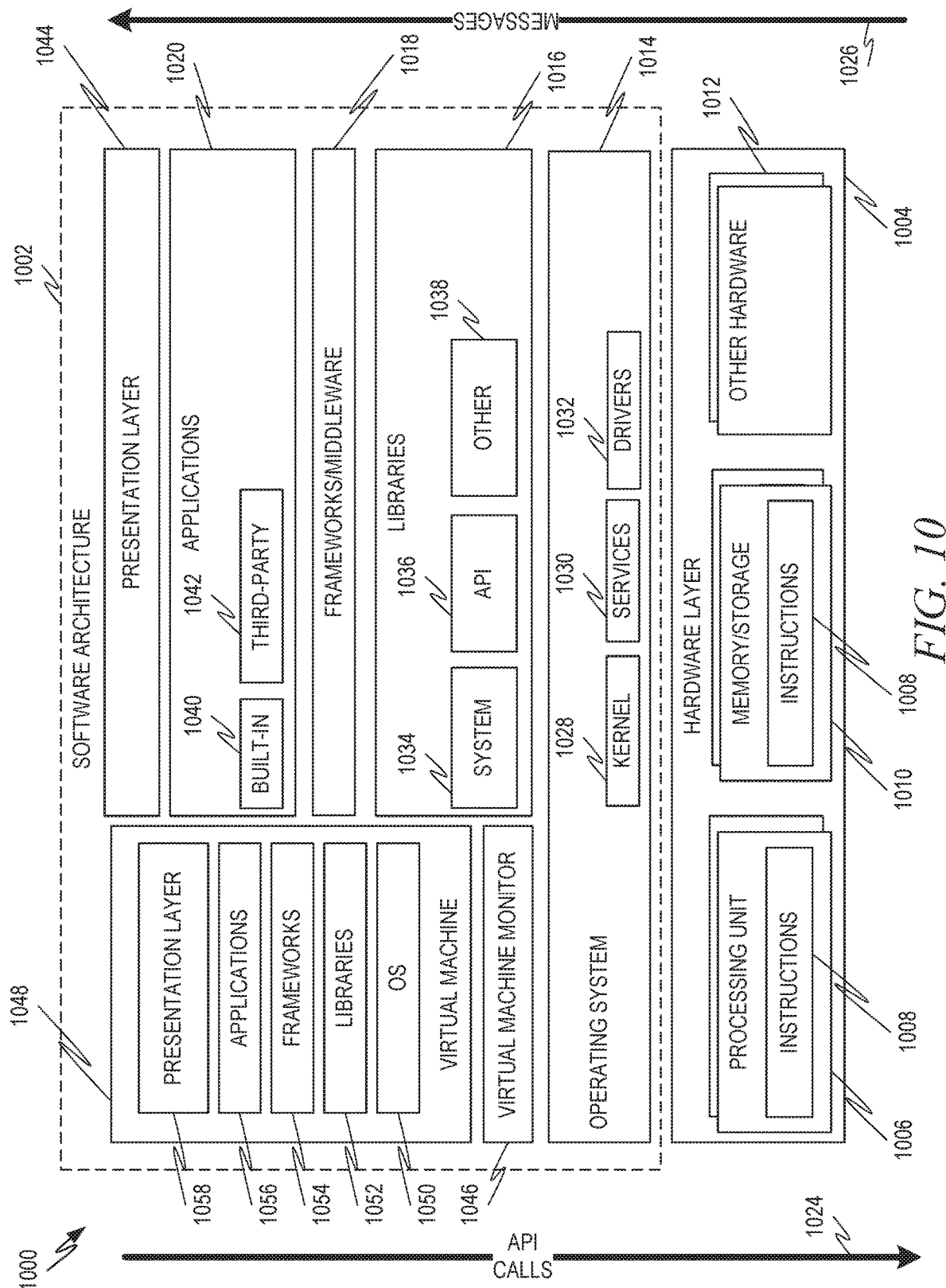
FIG. 10 is a block diagram showing one example of a software architecture for a computing device.

FIG. 10 is a block diagram 1000 showing one example of a software architecture 1002 for a computing device. The architecture 1002 may be used in conjunction with various hardware architectures, for example, as described herein. FIG. 10 is merely a non-limiting example of a software architecture and many other architectures may be implemented to facilitate the functionality described herein. A representative hardware layer 1004 is illustrated and can represent, for example, any of the above referenced computing devices. In some examples, the hardware layer 1004 may be implemented according to the architecture of the computer system 1100 of FIG. 11.

The representative hardware layer 1004 comprises one or more processing units 1006 having associated executable instructions 1008. Executable instructions 1008 represent the executable instructions of the software architecture 1002, including implementation of the methods, modules, subsystems, and components, and so forth described herein and may also include memory and/or storage modules 1010, which also have executable instructions 1008. Hardware layer 1004 may also comprise other hardware as indicated by other hardware 1012 which represents any other hardware of the hardware layer 1004, such as the other hardware illustrated as part of computer system 1100.

In the example architecture of FIG. 10, the software architecture 1002 may be conceptualized as a stack of layers where each layer provides particular functionality. For example, the software architecture 1002 may include layers such as an operating system 1014, libraries 1016, frameworks/middleware 1018, applications 1020 and presentation layer 1044. Operationally, the applications 1020 and/or other components within the layers may invoke application programming interface (API) calls 1024 through the software stack and access a response, returned values, and so forth illustrated as messages 1026 in response to the API calls 1024. The layers illustrated are representative in nature and not all software architectures have all layers. For example, some mobile or special purpose operating systems may not provide a frameworks/middleware layer 1018, while others may provide such a layer. Other software architectures may include additional or different layers.

The operating system 1014 may manage hardware resources and provide common services. The operating system 1014 may include, for example, a kernel 1028, services 1030, and drivers 1032. The kernel 1028 may act as an abstraction layer between the hardware and the other software layers. For example, the kernel 1028 may be responsible for memory management, processor management (e.g., scheduling), component management, networking, security settings, and so on. The services 1030 may provide other common services for the other software layers. In some examples, the services 1030 include an interrupt service. The interrupt service may detect the receipt of an interrupt and, in response, cause the architecture 1002 to pause its current processing and execute an interrupt service routine (ISR) when an interrupt is accessed.

The drivers 1032 may be responsible for controlling or interfacing with the underlying hardware. For instance, the drivers 1032 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1016 may provide a common infrastructure that may be utilized by the applications 1020 and/or other components and/or layers. The libraries 1016 typically provide functionality that allows other software modules to perform tasks in an easier fashion than to interface directly with the underlying operating system 1014 functionality (e.g., kernel 1028, services 1030 and/or drivers 1032). The libraries 1016 may include system 1034 libraries (e.g., C standard library) that may provide functions such as memory allocation functions, string manipulation functions, mathematic functions, and the like. In addition, the libraries 1016 may include API libraries 1036 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 9D in a graphic content on a display), database libraries (e.g., SQLite that may provide various relational database functions), web libraries (e.g., WebKit that may provide web browsing functionality), and the like. The libraries 1016 may also include a wide variety of other libraries 1038 to provide many other APIs to the applications 1020 and other software components/modules.

The frameworks 1018 (also sometimes referred to as middleware) may provide a higher-level common infrastructure that may be utilized by the applications 1020 and/or other software components/modules. For example, the frameworks 1018 may provide various graphic user interface (GUI) functions, high-level resource management, high-level location services, and so forth. The frameworks 1018 may provide a broad spectrum of other APIs that may be utilized by the applications 1020 and/or other software components/modules, some of which may be specific to a particular operating system or platform.

The applications 1020 includes built-in applications 1040 and/or third party applications 1042. Examples of representative built-in applications 1040 may include, but are not limited to, a contacts application, a browser application, a book reader application, a location application, a media application, a messaging application, and/or a game application. Third party applications 1042 may include any of the built in applications as well as a broad assortment of other applications. In a specific example, the third party application 1042 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third party application 1042 may invoke the API calls 1024 provided by the mobile operating system such as operating system 1014 to facilitate functionality described herein.

The applications 1020 may utilize built in operating system functions (e.g., kernel 1028, services 1030 and/or drivers 1032), libraries (e.g., system 1034, APIs 1036, and other libraries 1038), frameworks middleware 1018 to create user interfaces to interact with users of the system. Alternatively, or additionally, in some systems interactions with a user may occur through a presentation layer, such as presentation layer 1044. In these systems, the application/module "logic" can be separated from the aspects of the application/module that interact with a user.

Some software architectures utilize virtual machines. In the example of FIG. 10, this is illustrated by virtual machine 1048. A virtual machine creates a software environment where applications/modules can execute as if they were executing on a hardware computing device. A virtual machine is hosted by a host operating system (operating system 1014) and typically, although not always, has a virtual machine monitor 1046, which manages the operation of the virtual machine as well as the interface with the host operating system (i.e., operating system 1014). A software architecture executes within the virtual machine such as an operating system 1050, libraries 1052, frameworks/middleware 1054, applications 1056 and/or presentation layer 1058. These layers of software architecture executing within the virtual machine 1048 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry. e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 11:
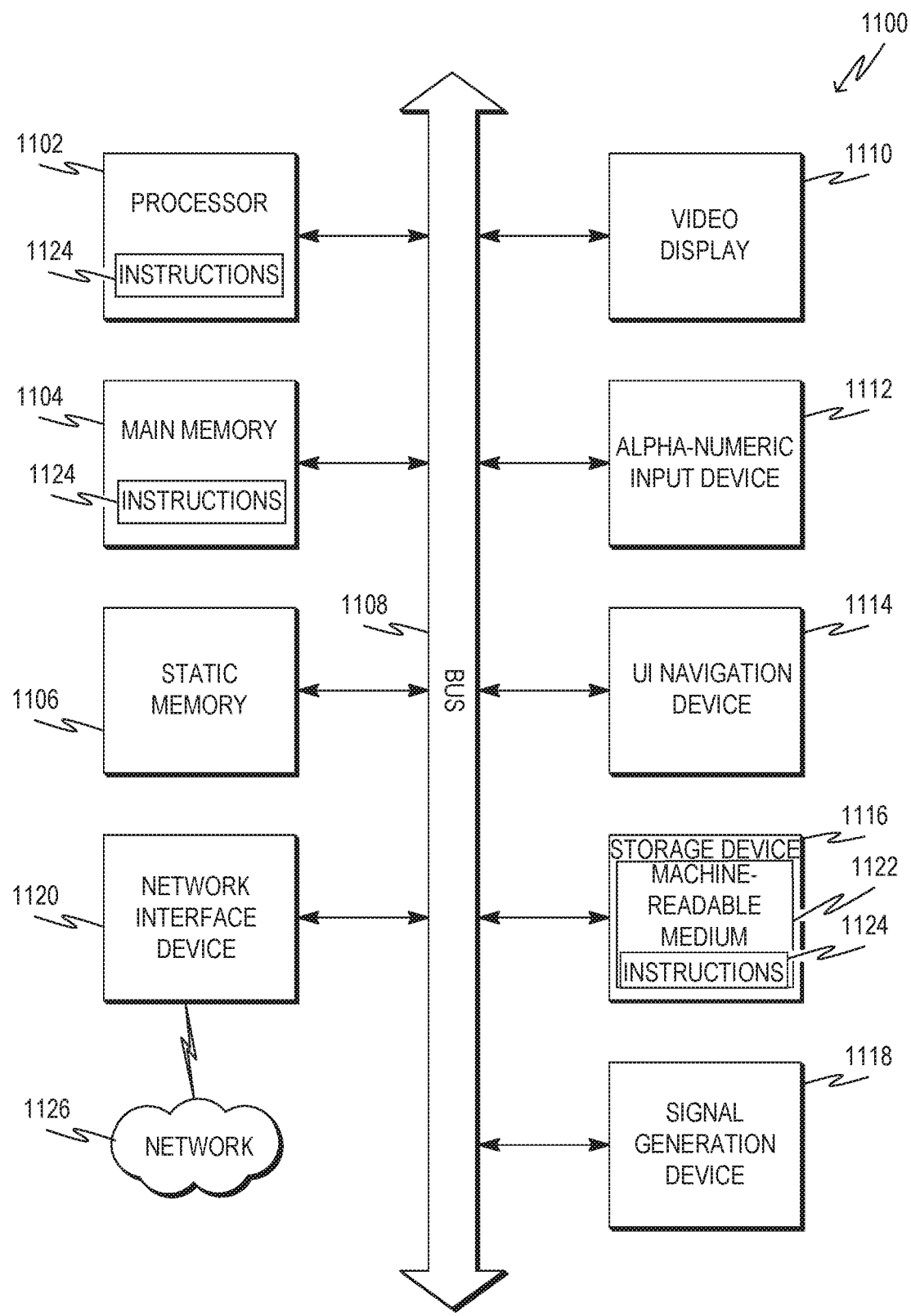
FIG. 11 is a block diagram of a machine in the example form of a computer system within which instructions may be executed for causing the machine to perform any one or more of the methodologies discussed herein.

FIG. 11 is a block diagram of a machine in the example form of a computer system 1100 within which instructions 1124 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU), or both), a main memory 1104, and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard or a touch-sensitive display screen), a user interface (UI) navigation (or cursor control) device 1114 (e.g., a mouse), a disk drive unit 1116, a signal generation device 1118 (e.g., a speaker), and a network interface device 1120.

Machine-Readable Medium

The disk drive unit 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104 and/or within the processor 1102 during execution thereof by the computer system 1100, with the main memory 1104 and the processor 1102 also constituting machine-readable media 1122.

While the machine-readable medium 1122 is shown in an example embodiment to be a single medium, the term "machine-readable medium" may include a single medium or multiple media (e.g., a centralized or distributed database, and/or associated caches and servers) that store the one or more instructions 1124 or data structures. The term "machine-readable medium" shall also be taken to include any tangible medium that is capable of storing, encoding, or carrying instructions 1124 for execution by the machine and that cause the machine to perform any one or more of the methodologies of the present disclosure, or that is capable of storing, encoding, or carrying data structures utilized by or associated with such instructions 1124. The term "machine-readable medium" shall accordingly be taken to include, but not be limited to, solid-state memories, and optical and magnetic media. Specific examples of machine-readable media 1122 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1124 may further be transmitted or received over a communications network 1126 using a transmission medium. The instructions 1124 may be transmitted using the network interface device 1120 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1124 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Examples

Example 1 is a database management system for managing a warehouse, the database management system comprising: at least one processor and memory in communication with the at least one processor, wherein the database management system is programmed to perform operations comprising: receiving warehouse graph data describing a plurality of nodes comprising a depot node, and a plurality of internode paths; generating a set of candidate routes through the warehouse based at least in part on the warehouse graph data, wherein the generating comprises: selecting a first path of a first route from the depot node to a second node of the plurality of nodes, based at least in part on a path probability of the first path; updating the path probability of the first path; and selecting a second path of the first route from the second node to a third node of the plurality of nodes, based at least in part on a path probability of the second path; receiving order data describing a plurality of orders to be filled from the warehouse; assigning orders from the plurality of orders to routes from the set of candidate routes to reduce a total duration for the routes; generating a set of tasks, wherein a first task of the set of tasks comprises a route and an order of the plurality of orders matched to the route; receiving picking agent data describing a plurality of picking agents for picking products at the warehouse; and assigning tasks from the set of tasks to picking agents from the plurality of picking agents to reduce a duration of a longest task from the set of tasks.

In Example 2, the subject matter of Example 1 optionally includes wherein generating the set of candidate routes further comprises: determining that an end condition for the first route is true; and selecting at least one path from a current node of the first route to the depot node, wherein the first route comprises the first path, the second path, and the at least one path.

In Example 3, the subject matter of Example 2 optionally includes wherein generating the set of candidate routes further comprises randomly selecting a number of paths for the first route, wherein determining that the end condition for the first route is true comprises determining that the first route comprises at least the first number of paths.

In Example 4, the subject matter of any one or more of Examples 1-3 optionally includes wherein updating the path probability of the first path comprises reducing a probability that the first path will be incorporated into a later candidate route.

In Example 5, the subject matter of any one or more of Examples 1-4 optionally includes wherein the total duration for the routes is a sum of durations for routes in the set of candidate routes, and wherein the duration for a first route in the set of candidate routes is based at least in part on a picking agent capacity for the first route and a quantity of products in orders matched to the route.

In Example 6, the subject matter of any one or more of Examples 1-5 optionally includes wherein generating the set of tasks comprises: identifying an overloaded route for which a sum of products for orders assigned to the overloaded route is greater than a picking agent capacity; generating a second task of the set of tasks comprising the overloaded route and a first portion of the orders matched to the overloaded route comprising fewer products than the picking agent capacity; and generating a third task of the set of tasks comprising the overloaded route and a second portion of the orders matched to the route comprising fewer products than the picking agent capacity.

In Example 7, the subject matter of any one or more of Examples 1-6 optionally includes wherein generating the set of tasks comprises: identifying an overloaded route for which a sum of products for orders assigned to the overloaded route is greater than a picking agent capacity; generating a set of candidate tasks, wherein the set of candidate tasks comprises the set of candidate routes and a copy of the overloaded route; and matching orders from the plurality of orders to candidate tasks from the set of candidate tasks to minimize a total duration for the set of candidate tasks.

In Example 8, the subject matter of any one or more of Examples 1-7 optionally includes wherein assigning orders from the plurality of orders to routes from the set of candidate routes comprises minimizing the total duration for the routes, wherein the total duration for the routes is a sum of a route duration for each of the set of candidate routes, and wherein the route duration for a first route is based at least in part on a number or products from orders assigned to the route.

In Example 9, the subject matter of any one or more of Examples 1-8 optionally includes wherein assigning tasks from the set of tasks to picking agents comprises minimizing the duration of the longest task from the set of tasks.

Example 10 is a method for managing a warehouse, comprising: receiving, by a database management system, warehouse graph data describing a plurality of nodes comprising a depot node, and a plurality of internode paths, wherein the database management system comprises at least one processor and memory in communication with the at least one processor; generating, by the database management system, a set of candidate routes through the warehouse based at least in part on the warehouse graph data, wherein the generating comprises: selecting a first path of a first route from the depot node to a second node of the plurality of nodes, based at least in part on a path probability of the first path; updating the path probability of the first path; and selecting a second path of the first route from the second node to a third node of the plurality of nodes, based at least in part on a path probability of the second path; receiving, by the database management system, order data describing a plurality of orders to be filled from the warehouse; assigning, by the database management system, orders from the plurality of orders to routes from the set of candidate routes to minimize a total duration for the routes; generating, by the database management system a set of tasks, wherein a first task of the set of tasks comprises a route and an order of the plurality of orders matched to the route; receiving, by the database management system picking agent data describing a plurality of picking agents for picking products at the warehouse; and assigning, by the database management system, tasks from the set of tasks to picking agents from the plurality of picking agents to minimize a duration of a longest task from the set of tasks.

In Example 11, the subject matter of Example 10 optionally includes wherein generating the set of candidate routes further comprises: determining that an end condition for the first route is true; and selecting at least one path from a current node of the first route to the depot node, wherein the first route comprises the first path, the second path, and the at least one path.

In Example 12, the subject matter of Example 11 optionally includes wherein generating the set of candidate routes further comprises randomly selecting a number of paths for the first route, wherein determining that the end condition for the first route is true comprises determining that the first route comprises at least the first number of paths.

In Example 13, the subject matter of any one or more of Examples 10-12 optionally includes wherein updating the path probability of the first path comprises reducing a probability that the first path will be incorporated into a later candidate route.

In Example 14, the subject matter of any one or more of Examples 10-13 optionally includes wherein the total duration for the routes is a sum of durations for routes in the set of candidate routes, and wherein the duration for a first route in the set of candidate routes is based at least in part on a picking agent capacity for the first route and a quantity of products in orders matched to the route.

In Example 15, the subject matter of any one or more of Examples 10-14 optionally includes wherein generating the set of tasks comprises: identifying an overloaded route for which a sum of products for orders assigned to the overloaded route is greater than a picking agent capacity; generating a second task of the set of tasks comprising the overloaded route and a first portion of the orders matched to the overloaded route comprising fewer products than the picking agent capacity; and generating a third task of the set of tasks comprising the overloaded route and a second portion of the orders matched to the route comprising fewer products than the picking agent capacity.

In Example 16, the subject matter of any one or more of Examples 10-15 optionally includes wherein generating the set of tasks comprises: identifying an overloaded route for which a sum of products for orders assigned to the overloaded route is greater than a picking agent capacity; generating a set of candidate tasks, wherein the set of candidate tasks comprises the set of candidate routes and a copy of the overloaded route; and matching orders from the plurality of orders to candidate tasks from the set of candidate tasks to minimize a total duration for the set of candidate tasks.

In Example 17, the subject matter of any one or more of Examples 10-16 optionally includes wherein assigning orders from the plurality of orders to routes from the set of candidate routes comprises minimizing the total duration for the routes, wherein the total duration for the routes is a sum of a route duration for each of the set of candidate routes, and wherein the route duration for a first route is based at least in part on a number or products from orders assigned to the route.

Example 18 is a machine-readable medium comprising instructions thereon that, when executed by at least one processor, cause the at least one processor to perform operations comprising: receiving warehouse graph data describing a plurality of nodes comprising a depot node, and a plurality of internode paths; generating a set of candidate routes through the warehouse based at least in part on the warehouse graph data, wherein the generating comprises: selecting a first path of a first route from the depot node to a second node of the plurality of nodes, based at least in part on a path probability of the first path; updating the path probability of the first path; and selecting a second path of the first route from the second node to a third node of the plurality of nodes, based at least in part on a path probability of the second path; receiving order data describing a plurality of orders to be filled from the warehouse; assigning orders from the plurality of orders to routes from the set of candidate routes to minimize a total duration for the routes; generating a set of tasks, wherein a first task of the set of tasks comprises a route and an order of the plurality of orders matched to the route; receiving picking agent data describing a plurality of picking agents for picking products at the warehouse; and assigning tasks from the set of tasks to picking agents from the plurality of picking agents to minimize a duration of a longest task from the set of tasks.

In Example 19, the subject matter of Example 18 optionally includes wherein generating the set of candidate routes further comprises: determining that an end condition for the first route is true; and selecting at least one path from a current node of the first route to the depot node, wherein the first route comprises the first path, the second path, and the at least one path.

In Example 20, the subject matter of Example 19 optionally includes wherein generating the set of candidate routes further comprises randomly selecting a number of paths for the first route, wherein determining that the end condition for the first route is true comprises determining that the first route comprises at least the first number of paths.

What is claimed is:

1. An in-memory database management system for managing a warehouse, the database management system comprising:
    at least one processor and memory in communication with the at least one processor, wherein the database management system is programmed to perform operations comprising:
    receiving warehouse graph data describing a plurality of nodes comprising a depot node, and a plurality of internode paths;
    generating a set of candidate routes through the warehouse based at least in part on the warehouse graph data, wherein the generating comprises:
    selecting a first path of a first route from the depot node to a second node of the plurality of nodes, based at least in part on a path probability of the first path;
    updating the path probability of the first path; and
    selecting a second path of the first route from the second node to a third node of the plurality of nodes, based at least in part on a path probability of the second path;
    receiving order data describing a plurality of orders to be filled from the warehouse;
    structuring a linear programming problem at least in part by modifying objective data indicating an objective to minimize a total duration for picking the plurality of orders to generate modified objective data, the modified objective data comprising a breakpoint variable, the breakpoint variable indicating a picking agent capacity for at least one of the set of candidate routes, the picking agent capacity indicating a number of products that can be carried by a picking agent;
    solving the linear programming problem, by an optimization engine of the database management system, to assign orders from the plurality of orders to routes from the set of candidate routes using the objective data;
    identifying an overloaded route from the set of candidate routes for which a sum of products in a set of orders assigned to the overloaded route is greater than the picking agent capacity;
    generating a set of tasks comprising a first task and a second task, the first task comprising the overloaded route and a first portion of the set of orders assigned to the overloaded route, the first portion of the set of orders having a sum of products that is less than the picking agent capacity, the second task comprising the overloaded route and a second portion of the orders matched to the overloaded route, the second portion of the set of orders having a sum of products that is less than the picking agent capacity;
    receiving picking agent data describing a plurality of picking agents for picking products at the warehouse;
    assigning tasks from the set of tasks to picking agents from the plurality of picking agents to reduce a duration of a longest task from the set of tasks, the assigning comprising assigning the first task to a robotic picking agent, the robotic picking agent to traverse the warehouse according to the overloaded route to pick products from the first portion of the set of orders assigned to the overloaded route; and
    instructing the robotic picking agent to begin executing the first task.

2. The system of claim 1, wherein generating the set of candidate routes further comprises:
    determining that an end condition for the first route is true; and
    selecting at least one path from a current node of the first route to the depot node, wherein the first route comprises the first path, the second path, and the at least one path.

3. The system of claim 2, wherein generating the set of candidate routes further comprises randomly selecting a number of paths for the first route, wherein determining that the end condition for the first route is true comprises determining that the first route comprises at least the number of paths.

4. The system of claim 1, wherein updating the path probability of the first path comprises reducing a probability that the first path will be incorporated into a later candidate route.

5. The system of claim 1, wherein the total duration for the routes is a sum of durations for routes in the set of candidate routes, and wherein the duration for a first route in the set of candidate routes is based at least in part on a picking agent capacity for the first route and a quantity of products in orders matched to the route.

6. The system of claim 1, wherein generating the set of tasks comprises:
    identifying an overloaded route for which a sum of products for orders assigned to the overloaded route is greater than a picking agent capacity;
    generating a set of candidate tasks, wherein the set of candidate tasks comprises the set of candidate routes and a copy of the overloaded route; and
    matching orders from the plurality of orders to candidate tasks from the set of candidate tasks to minimize a total duration for the set of candidate tasks.

7. The system of claim 1, wherein assigning orders from the plurality of orders to routes from the set of candidate routes comprises minimizing the total duration for the routes, wherein the total duration for the routes is a sum of a route duration for each of the set of candidate routes, and wherein the route duration for a first route is based at least in part on a number or products from orders assigned to the route.

8. The system of claim 1, wherein assigning tasks from the set of tasks to picking agents comprises minimizing the duration of the longest task from the set of tasks.

9. A method for managing a warehouse using an in-memory database management system, the method comprising:
    receiving, by the in-memory database management system, warehouse graph data describing a plurality of nodes comprising a depot node, and a plurality of internode paths, wherein the database management system comprises at least one processor and memory in communication with the at least one processor;
    generating, by the in-memory database management system, a set of candidate routes through the warehouse based at least in part on the warehouse graph data, wherein the generating comprises:
    selecting, by the in-memory database management system, a first path of a first route from the depot node to a second node of the plurality of nodes, based at least in part on a path probability of the first path;

updating, by the in-memory database management system, the path probability of the first path; and selecting, by the in-memory database management system, a second path of the first route from the second node to a third node of the plurality of nodes, based at least in part on a path probability of the second path;

receiving, by the in-memory database management system, order data describing a plurality of orders to be filled from the warehouse;

structuring a linear programming problem at least in part by modifying objective data indicating an objective to minimize a total duration for picking the plurality of orders to generate modified objective data, the modified objective data comprising a breakpoint variable, the breakpoint variable indicating a picking agent capacity for at least one of the set of candidate routes, the picking agent capacity indicating a number of products that can be carried by a picking agent;

solving the linear programming problem, by an optimization engine of the in-memory database management system, to assign orders from the plurality of orders to routes from the set of candidate routes using the objective data;

identifying, by the in-memory database management system, an overloaded route from the set of candidate routes for which a sum of products in a set of orders assigned to the overloaded route is greater than the picking agent capacity;

generating, by the in-memory database management system, a set of tasks comprising a first task and a second task, the first task comprising the overloaded route and a first portion of the set of orders having a sum of products that is less than the picking agent capacity, the second task comprising the overloaded route and a second portion of the orders matched to the overloaded route, the second portion of the set of orders having a sum of products that is less than the picking agent capacity;

receiving, by the in-memory database management system, picking agent data describing a plurality of picking agents for picking products at the warehouse;

assigning, by the in-memory database management system, tasks from the set of tasks to picking agents from the plurality of picking agents to minimize a duration of a longest task from the set of tasks, the assigning comprising assigning the first task to a robotic picking agent, the robotic picking agent to traverse the warehouse according to the overloaded route to pick products from the first portion of the set of orders assigned to the overloaded route; and instructing, by the in-memory database management system, the robotic picking agent to begin executing the first task.

10. The method of claim 9, wherein generating the set of candidate routes further comprises:

determining that an end condition for the first route is true; and selecting at least one path from a current node of the first route to the depot node, wherein the first route comprises the first path, the second path, and the at least one path.

11. The method of claim 10, wherein generating the set of candidate routes further comprises randomly selecting a number of paths for the first route, wherein determining that the end condition for the first route is true comprises determining that the first route comprises at least the number of paths.

12. The method of claim 9, wherein updating the path probability of the first path comprises reducing a probability that the first path will be incorporated into a later candidate route.

13. The method of claim 9, wherein the total duration for the routes is a sum of durations for routes in the set of candidate routes, and wherein the duration for a first route in the set of candidate routes is based at least in part on a picking agent capacity for the first route and a quantity of products in orders matched to the route.

14. The method of claim 9, wherein generating the set of tasks comprises:

identifying an overloaded route for which a sum of products for orders assigned to the overloaded route is greater than a picking agent capacity;

generating a set of candidate tasks, wherein the set of candidate tasks comprises the set of candidate routes and a copy of the overloaded route; and matching orders from the plurality of orders to candidate tasks from the set of candidate tasks to minimize a total duration for the set of candidate tasks.

15. The method of claim 9, wherein assigning orders from the plurality of orders to routes from the set of candidate routes comprises minimizing the total duration for the routes, wherein the total duration for the routes is a sum of a route duration for each of the set of candidate routes, and wherein the route duration for a first route is based at least in part on a number or products from orders assigned to the route.

16. A non-transitory machine-readable medium comprising instructions thereon that, when executed by at least one processor, cause the at least one processor to perform operations comprising:

receiving warehouse graph data for a warehouse, the warehouse graph data describing a plurality of nodes comprising a depot node, and a plurality of internode paths;

generating a set of candidate routes through the warehouse based at least in part on the warehouse graph data, wherein the generating comprises:

selecting a first path of a first route from the depot node to a second node of the plurality of nodes, based at least in part on a path probability of the first path;

updating the path probability of the first path; and selecting a second path of the first route from the second node to a third node of the plurality of nodes, based at least in part on a path probability of the second path;

receiving order data describing a plurality of orders to be filled from the warehouse;

structuring a linear programming problem at least in part by modifying objective data indicating an objective to minimize a total duration for picking the plurality of orders to generate modified objective data, the modified objective data comprising a breakpoint variable, the breakpoint variable indicating a picking agent capacity for at least one of the set of candidate routes, the picking agent capacity indicating a number of products that can be carried by a picking agent;

solving the linear programming problem, by an optimization engine of an in-memory database management system, to assign orders from the plurality of orders to routes from the set of candidate routes using the objective data;

identifying an overloaded route from the set of candidate routes for which a sum of products in a set of orders assigned to the overloaded route is greater than the picking agent capacity;

generating a set of tasks comprising a first task and a second task, the first task the overloaded route and a first portion of the set of orders assigned to the overloaded route, the first portion of the set of orders having a sum of products that is less than the picking agent capacity, the second task comprising the overloaded route and a second portion of the orders matched to the overloaded route, the second portion of the set of orders having a sum of products that is less than the picking agent capacity;

receiving picking agent data describing a plurality of picking agents for picking products at the warehouse;

assigning tasks from the set of tasks to picking agents from the plurality of picking agents to minimize a duration of a longest task from the set of tasks, the assigning comprising assigning the first task to a robotic picking agent, the robotic picking agent to traverse the warehouse according to the overloaded route to pick products from the first portion of the set of orders assigned to the overloaded route; and instructing the robotic picking agent to begin executing the first task.

17. The medium of claim 16, wherein generating the set of candidate routes further comprises:

determining that an end condition for the first route is true; and selecting at least one path from a current node of the first route to the depot node, wherein the first route comprises the first path, the second path, and the at least one path.

18. The medium of claim 17, wherein generating the set of candidate routes further comprises randomly selecting a number of paths for the first route, wherein determining that the end condition for the first route is true comprises determining that the first route comprises at least the number of paths.

19. The medium of claim 17, wherein updating the path probability of the first path comprises reducing a probability that the first path will be incorporated into a later candidate route.

20. The medium of claim 17, wherein the total duration for the routes is a sum of durations for routes in the set of candidate routes, and wherein the duration for a first route in the set of candidate routes is based at least in part on a picking agent capacity for the first route and a quantity of products in orders matched to the route.

* * * * *